(12) United States Patent
Khoshnevisan et al.

(10) Patent No.: US 12,232,184 B2
(45) Date of Patent: Feb. 18, 2025

(54) UPLINK BEAM SWEEPING DURING RANDOM ACCESS PROCEDURES

(71) Applicant: QUALCOMM Incorporated, San Diego, CA (US)

(72) Inventors: Mostafa Khoshnevisan, San Diego, CA (US); Xiaoxia Zhang, San Diego, CA (US); Peter Gaal, San Diego, CA (US); Tao Luo, San Diego, CA (US); Mahmoud Taherzadeh Boroujeni, San Diego, CA (US); Jing Sun, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 471 days.

(21) Appl. No.: 17/412,195

(22) Filed: Aug. 25, 2021

(65) Prior Publication Data
US 2023/0062505 A1    Mar. 2, 2023

(51) Int. Cl.
| | |
|---|---|
| *H04W 72/04* | (2023.01) |
| *H04B 7/06* | (2006.01) |
| *H04L 5/00* | (2006.01) |
| *H04W 16/28* | (2009.01) |
| *H04W 72/044* | (2023.01) |
| *H04W 74/0833* | (2024.01) |

(52) U.S. Cl.
CPC ...... *H04W 74/0841* (2013.01); *H04B 7/0695* (2013.01); *H04L 5/0051* (2013.01); *H04W 16/28* (2013.01); *H04W 72/046* (2013.01)

(58) Field of Classification Search
CPC ............. H04W 74/0841; H04W 16/28; H04W 72/046; H04W 74/0833; H04B 7/0695; H04L 5/0051; H04L 5/0023
See application file for complete search history.

(56) References Cited

U.S. PATENT DOCUMENTS

| | | | |
|---|---|---|---|
| 2017/0195033 A1* | 7/2017 | Zhang | H04L 5/005 |
| 2018/0131434 A1* | 5/2018 | Islam | H04B 7/0408 |
| 2018/0254922 A1* | 9/2018 | Stirling-Gallacher | |
| | | | H04B 7/088 |
| 2019/0097874 A1* | 3/2019 | Zhou | H04W 16/28 |
| 2019/0174551 A1* | 6/2019 | Liu | H04W 74/0833 |
| 2020/0314913 A1* | 10/2020 | Rastegardoost | H04W 36/0077 |
| 2020/0336355 A1* | 10/2020 | Yamada | H04B 7/0456 |
| 2021/0120581 A1* | 4/2021 | Kim | H04L 1/0003 |
| 2021/0153040 A1* | 5/2021 | Zhou | H04L 5/0023 |
| 2022/0174728 A1* | 6/2022 | Ohara | H04W 74/0833 |

(Continued)

*Primary Examiner* — Zhiren Qin
(74) *Attorney, Agent, or Firm* — Holland & Hart LLP

(57) ABSTRACT

Methods, systems, and devices for wireless communications are described. The method may involve a user equipment (UE) utilizing beam sweeping during a random access procedure to determine an uplink beam for subsequent communication with a base station. The UE may transmit a first message indicating a random access preamble for a random access procedure and a plurality of reference signals using a set of directional beams. The base station may receive the reference signals or information related to the reference signals and transmit a second message indicating a directional beam of the set of directional beams and a set of resources. Upon receiving the second message, the UE may transmit the third message over the set of resources using the indicated directional beam.

30 Claims, 17 Drawing Sheets

(56) References Cited

U.S. PATENT DOCUMENTS

| | | | |
|---|---|---|---|
| 2022/0201672 A1* | 6/2022 | Tomeba | H04W 72/046 |
| 2022/0240326 A1* | 7/2022 | Rune | H04W 56/001 |
| 2022/0264659 A1* | 8/2022 | Enbuske | H04B 17/318 |
| 2023/0156809 A1* | 5/2023 | Xu | H04L 1/189 |
| | | | 370/329 |
| 2023/0199681 A1* | 6/2023 | Hwang | H04W 48/10 |

* cited by examiner

UPLINK BEAM SWEEPING DURING RANDOM ACCESS PROCEDURES

FIELD OF TECHNOLOGY

The following relates to wireless communications, including uplink beam sweeping during random access procedures.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may undergo a random access procedure to establish a communication link with a base station. During the random access procedure, the UE may transmit multiple random access messages to the base station (e.g., Msg1 or Msg3) using a directional beam. The directional beam used by the UE to transmit the random access messages to the base station may be based on a previous beam selection procedure, where the directional beam is chosen based on a measured signal strength of downlink reference signals.

SUMMARY

The described techniques relate to improved methods, systems, devices, and apparatuses that support uplink beam sweeping during random access procedures. Generally, the described techniques provide for a user equipment (UE) to perform an uplink beam sweeping procedure during a random access procedure in an effort to determine a best uplink beam for subsequent communication with a base station. In some examples, the UE may initiate a random access procedure by transmitting a preamble to the base station. Upon transmitting the preamble, the UE may transmit a series of reference signals using a set of directional beams to the base station. The base station may receive the reference signal and select a directional beam from the set of directional beams. The base station may transmit random access response (RAR) message to the UE, where the RAR message includes an indication of the selected directional beam as well as a set of resources. The UE may receive the RAR message and transmit an uplink scheduling information message (e.g., Msg3) to the base station using the directional beam indicated in the RAR message and over the set of resources indicated in the RAR message. Using the techniques as described above may allow a UE to efficiently determine a best beam for communication with a base station during a random access procedure.

A method for wireless communication at a UE is described. The method may include transmitting a first message indicating at least a random access preamble for a random access procedure based on a configuration, transmitting a set of multiple reference signals using a set of directional beams, where transmitting the set of multiple reference signals is based on transmitting the first message, receiving, from a base station and as part of the random access procedure, a second message indicating a directional beam of the set of directional beams and a set of resources for transmitting a third message, and transmitting, as part of the random access procedure, the third message over the set of resources using the indicated directional beam.

An apparatus for wireless communication at a UE is described. The apparatus may include a processor, memory coupled with the processor, and instructions stored in the memory. The instructions may be executable by the processor to cause the apparatus to transmit a first message indicating at least a random access preamble for a random access procedure based on a configuration, transmit a set of multiple reference signals using a set of directional beams, where transmitting the set of multiple reference signals is based on transmitting the first message, receive, from a base station and as part of the random access procedure, a second message indicating a directional beam of the set of directional beams and a set of resources for transmitting a third message, and transmit, as part of the random access procedure, the third message over the set of resources using the indicated directional beam.

Another apparatus for wireless communication at a UE is described. The apparatus may include means for transmitting a first message indicating at least a random access preamble for a random access procedure based on a configuration, means for transmitting a set of multiple reference signals using a set of directional beams, where transmitting the set of multiple reference signals is based on transmitting the first message, means for receiving, from a base station and as part of the random access procedure, a second message indicating a directional beam of the set of directional beams and a set of resources for transmitting a third message, and means for transmitting, as part of the random access procedure, the third message over the set of resources using the indicated directional beam.

A non-transitory computer-readable medium storing code for wireless communication at a UE is described. The code may include instructions executable by a processor to transmit a first message indicating at least a random access preamble for a random access procedure based on a configuration, transmit a set of multiple reference signals using a set of directional beams, where transmitting the set of multiple reference signals is based on transmitting the first message, receive, from a base station and as part of the random access procedure, a second message indicating a directional beam of the set of directional beams and a set of resources for transmitting a third message, and transmit, as part of the random access procedure, the third message over the set of resources using the indicated directional beam.

Some examples of the method, apparatuses, and non-transitory computer-readable medium described herein may further include operations, features, means, or instructions for performing a beam selection procedure with the base station prior to transmitting the first message and identifying a second directional beam based on performing the beam selection procedure, where the first message may be transmitted using the second directional beam.

Some examples of the method, apparatuses, and non-transitory computer-readable medium described herein may further include operations, features, means, or instructions for determining whether a signal strength value associated with the second directional beam satisfies a threshold, where transmitting the set of multiple reference signals may be based on the signal strength value satisfying the threshold.

In some examples of the method, apparatuses, and non-transitory computer-readable medium described herein, the directional beam may be different from the second directional beam.

In some examples of the method, apparatuses, and non-transitory computer-readable medium described herein, the configuration indicates a set of parameters associated with the set of multiple reference signals, the set of parameters including an indication of a quantity of reference signals, a second set of resources for transmitting each reference signal of the set of multiple reference signals, a quantity of demodulation reference signal (DMRS) ports for transmitting the set of multiple reference signals, a quantity of sounding reference signal (SRS) ports for transmitting the set of multiple reference signals, a scrambling sequence to generate the set of multiple reference signals, a time duration between transmitting a first reference signal of the set of multiple reference signals and transmitting a second reference signal of the set of multiple reference signals, a time duration between transmitting the first message and transmitting a reference signal of the set of multiple reference signals, or a combination thereof.

In some examples of the method, apparatuses, and non-transitory computer-readable medium described herein, the configuration indicates a beam sweeping pattern for transmitting the set of multiple reference signals, the beam sweeping pattern including an indication of a quantity of directional beams, a quantity of resources associated with the same directional beam, a pattern as to which resources may be associated with the same directional beam, or a combination thereof.

In some examples of the method, apparatuses, and non-transitory computer-readable medium described herein, the configuration indicates power control parameters for transmitting the set of multiple reference signals, the power control parameters including an indication of an initial power value, a secondary power value, a power offset value with respect to power control parameters for transmitting the first message, a power ramp up value for each subsequent random access attempts, or a combination thereof.

Some examples of the method, apparatuses, and non-transitory computer-readable medium described herein may further include operations, features, means, or instructions for receiving, from the base station, the configuration via remaining minimum system information (RMSI) and determining the configuration using a preconfigured rule, the preconfigured rule based on a relationship between a random access occasion and a sequence associated with the random access preamble selected by the UE for the random access procedure.

Some examples of the method, apparatuses, and non-transitory computer-readable medium described herein may further include operations, features, means, or instructions for receiving, from the base station, system information signaling indicating a subset of a second set of resources allocated for random access signaling, where the first message may be transmitted over the subset of resources; and where transmitting the set of multiple reference signals may be based on transmitting the first message over the subset of resources.

Some examples of the method, apparatuses, and non-transitory computer-readable medium described herein may further include operations, features, means, or instructions for increasing a transmit power for a retransmission of the first message by a first amount based on the random access procedure failing and increasing a transmit power for a retransmission of the set of reference signals by a second amount based on the random access procedure failing, where the first amount may be different than the second amount.

In some examples of the method, apparatuses, and non-transitory computer-readable medium described herein, receiving the second message indicating the directional beam may include operations, features, means, or instructions for receiving an indication of a resource identifier (ID) associated with a reference signal of the set of multiple reference signals corresponding to the directional beam or a resource index of a set of resource indices, the set of resource indices corresponding to an order in which the set of multiple reference signals may be transmitted.

In some examples of the method, apparatuses, and non-transitory computer-readable medium described herein, one or both of the first message and the set of multiple reference signals may be transmitted without a timing advance.

In some examples of the method, apparatuses, and non-transitory computer-readable medium described herein, the set of multiple reference signals includes a set of multiple DMRSs or a set of multiple SRSs.

A method for wireless communication at a base station is described. The method may include transmitting, to a UE, a configuration for transmitting random access signaling, receiving a first message indicating at least a random access preamble for a random access procedure based on the configuration, selecting a directional beam from a set of directional beams, the set of directional beams associated with a set of multiple reference signals transmitted at the UE, and transmitting, to the UE, a second message indicating the selected directional beam and a set of resources for transmitting a third message.

An apparatus for wireless communication at a base station is described. The apparatus may include a processor, memory coupled with the processor, and instructions stored in the memory. The instructions may be executable by the processor to cause the apparatus to transmit, to a UE, a configuration for transmitting random access signaling, receive a first message indicating at least a random access preamble for a random access procedure based on the configuration, select a directional beam from a set of directional beams, the set of directional beams associated with a set of multiple reference signals transmitted at the UE, and transmit, to the UE, a second message indicating the selected directional beam and a set of resources for transmitting a third message.

Another apparatus for wireless communication at a base station is described. The apparatus may include means for transmitting, to a UE, a configuration for transmitting random access signaling, means for receiving a first message indicating at least a random access preamble for a random access procedure based on the configuration, means for selecting a directional beam from a set of directional beams, the set of directional beams associated with a set of multiple reference signals transmitted at the UE, and means for transmitting, to the UE, a second message indicating the selected directional beam and a set of resources for transmitting a third message.

A non-transitory computer-readable medium storing code for wireless communication at a base station is described. The code may include instructions executable by a processor to transmit, to a UE, a configuration for transmitting random access signaling, receive a first message indicating at least a random access preamble for a random access procedure based on the configuration, select a directional beam from a set of directional beams, the set of directional beams associated with a set of multiple reference signals transmitted at the UE, and transmit, to the UE, a second message indicating the selected directional beam and a set of resources for transmitting a third message.

Some examples of the method, apparatuses, and non-transitory computer-readable medium described herein may further include operations, features, means, or instructions for performing a beam selection procedure with the UE prior to receiving the first message and selecting a second directional beam based on performing the beam selection procedure.

In some examples of the method, apparatuses, and non-transitory computer-readable medium described herein, the directional beam may be different from the second directional beam.

In some examples of the method, apparatuses, and non-transitory computer-readable medium described herein, the configuration indicates a set of parameters associated with the set of multiple reference signals, the set of parameters including an indication of a quantity of reference signals, a second set of resources for transmitting each reference signal of the set of multiple reference signals, a quantity of DMRS ports for transmitting the set of multiple reference signals, a quantity of SRS ports for transmitting the set of multiple reference signals, a scrambling sequence to generate the set of multiple reference signals, a time duration between the UE transmitting a first reference signal of the set of multiple reference signals and transmitting a second reference signal of the set of multiple reference signals, a time duration between the UE transmitting the first message and transmitting a reference signal of the set of multiple reference signals, or a combination thereof.

In some examples of the method, apparatuses, and non-transitory computer-readable medium described herein, the configuration indicates a beam sweeping pattern for transmitting the set of multiple reference signals, the beam sweeping pattern including an indication of a quantity of directional beams, a quantity of resources associated with the same directional beam, a pattern as to which resources may be associated with the same directional beam, or a combination thereof.

In some examples of the method, apparatuses, and non-transitory computer-readable medium described herein, the configuration indicates power control parameters for transmitting the set of multiple reference signals, the power control parameters including an indication of an initial power value, a secondary power value, a power offset value with respect to power control parameters for transmitting the first message, a power ramp up value for each subsequent random access attempts, or a combination thereof.

In some examples of the method, apparatuses, and non-transitory computer-readable medium described herein, transmitting the configuration may include operations, features, means, or instructions for transmitting, to the UE, RMSI, the RMSI including the configuration.

Some examples of the method, apparatuses, and non-transitory computer-readable medium described herein may further include operations, features, means, or instructions for transmitting, to the UE, system information signaling indicating a subset of a second set of resources allocated for random access signaling, where the first message may be received over the subset of resources; and where the directional beam may be selected based on receiving the first message over the subset of resources.

In some examples of the method, apparatuses, and non-transitory computer-readable medium described herein, transmitting the second message indicating the directional beam may include operations, features, means, or instructions for transmitting an indication of a resource ID associated with a reference signal of the set of multiple reference signals corresponding to the directional beam or a resource index of a set of resource indices, the set of resource indices corresponding to an order in which the set of multiple reference signals may be transmitted.

In some examples of the method, apparatuses, and non-transitory computer-readable medium described herein, one or both of the first message and the set of multiple reference signals do not may have an applied timing advance.

In some examples of the method, apparatuses, and non-transitory computer-readable medium described herein, the set of multiple reference signals includes a set of multiple DMRSs or a set of multiple SRSs.

DETAILED DESCRIPTION

Figure 1:
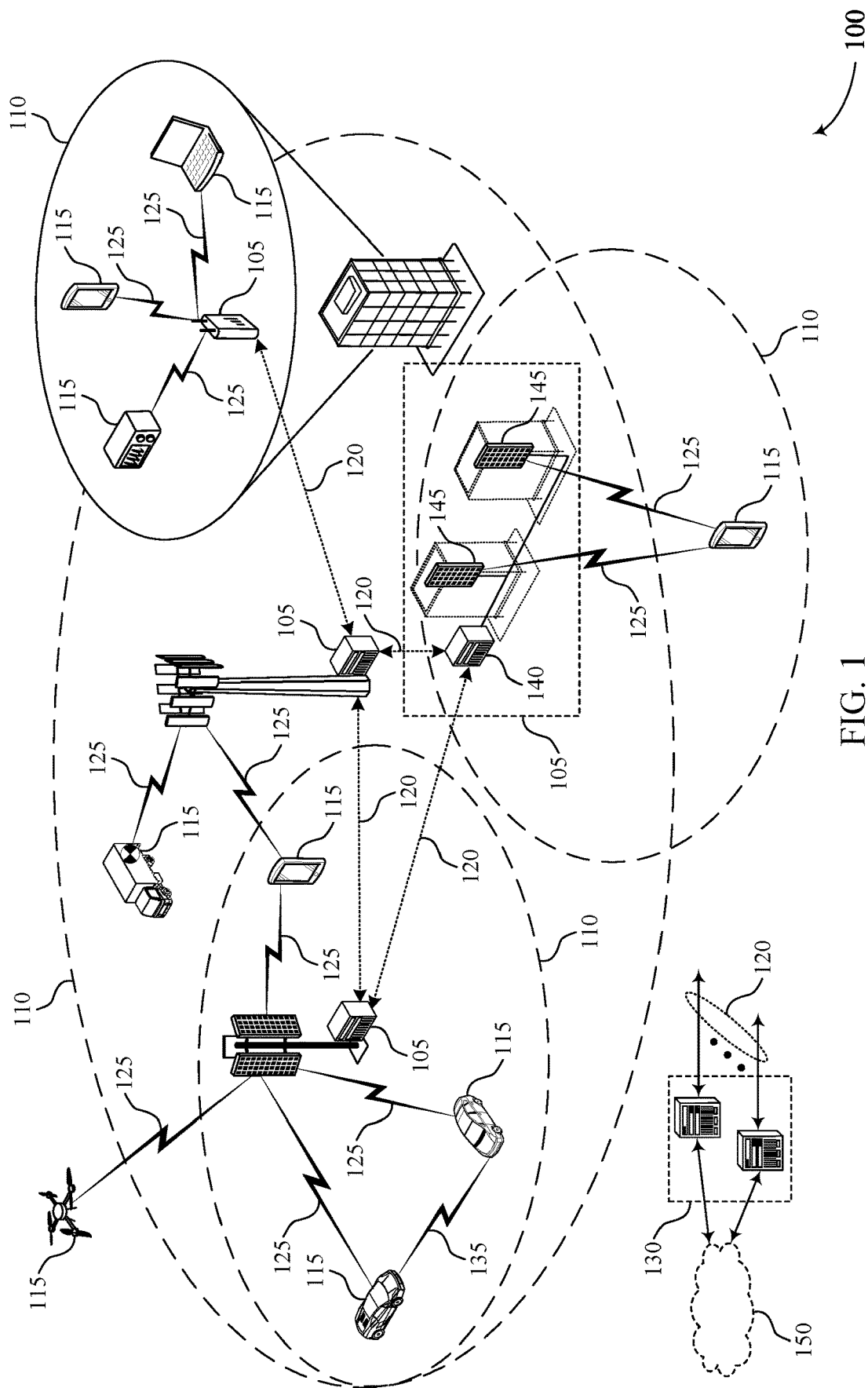
FIGS. 1 and 2 illustrate examples of a wireless communications system that supports uplink beam sweeping during random access procedures in accordance with aspects of the present disclosure.

In some examples, a user equipment (UE) may undergo a random access procedure to establish a communication link with a base station. To initiate the random access procedure, the UE may identify a random access preamble and transmit the random access preamble in a first message (e.g., Msg1) to the base station. In response, the base station may transmit a second message (e.g., Msg2) or a random access response (RAR) message to the UE that indicates uplink timing information as well as an uplink grant for transmitting a third message (e.g., Msg3). The UE may receive the second message and transmit the third message to the base station using the uplink grant indicated in the second message. Upon receiving the third message, the base station and the UE may, in some examples, undergo contention resolution. In some examples, the UE may transmit the first message and the third message using a directional beam determined from a prior beam selection procedure with the base station. That is, the directional beam may be based on a downlink beam of a synchronization signal block (SSB) or other downlink reference signal that the UE detected during the beam selection procedure. However, in some cases, the directional beam determined from the received downlink beam may not be the best beam to use for random access signaling, specifically when a wireless communications system supports uplink dense deployment, supplementary uplink techniques, or other techniques where the UE is capable of sending uplink messages using directional beams that are in a different direction than the downlink directional beams over which the UE received control messages or other signaling. In the case of uplink dense deployment, a UE may transmit uplink signals to an uplink reception point which are forwarded to the base station over a backhaul link. In the case of supplementary uplink, a UE may be configured with two uplink carriers for one downlink carrier of the same serving cell, and one or more of those uplink carriers may be transmitted using a different directional beam than the beam used for the downlink carrier.

As described herein, the UE may perform uplink beam sweeping during a random access procedure to determine a best beam (e.g., based on signal quality, channel measurements, or other quality metrics determined by the base station or the UE) for random access signaling. For example, after transmitting the first message, the UE may transmit multiple reference signals using a set of directional beams. In some examples, the UE may transmit the multiple reference signals to the base station or to an uplink reception point. The base station may select a directional beam from the set of direction beams based on the reference signals and include an indication of the selected directional beam in the second message transmitted to the UE. Upon receiving the second message, the UE may transmit the third message to the base station using the selected beam indicated in the second message. In some examples, the reference signals may be transmitted based on a configuration, where the configuration may include power control parameters for transmitting the reference signals, a beam sweeping pattern for transmitting the reference signals, etc. The UE may receive the configuration from the base station via remaining minimum system information (RMSI) or the UE may determine the configuration based on a preconfigured rule. Using the techniques as described above may allow a UE to determine a best beam for random access signaling, while reducing latency associated with beam selection during a random access procedure, among other benefits.

Aspects of the disclosure are initially described in the context of wireless communications systems. Additional aspects of the disclosure are described in the context of process flows. Aspects of the disclosure are further illustrated by and described with reference to apparatus diagrams, system diagrams, and flowcharts that relate to uplink beam sweeping during random access procedures.

FIG. 1 illustrates an example of a wireless communications system 100 that supports uplink beam sweeping during random access procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the UE 115 may perform an uplink beam sweeping procedure during a random access procedure in an effort to determine a best uplink beam (e.g., a suitable beam based on signal or channel quality metrics, traffic or load balancing, or any other metrics as determined by the base station 105, the UE 115, or both) for subsequent communication with a base station 105. In some examples, the UE 115 may initiate a random access procedure by transmitting a preamble to the base station 105. Upon transmitting the preamble, the UE 115 may transmit a series of reference signals using a set of directional beams to the base station 105. The base station 105 may receive the reference signal and select a directional beam from the set of directional beams (e.g., based on measurements performed by the base station 105). The base station 105 may transmit a RAR message to the UE 115 (or a similar message that is responsive to the first uplink message), where the RAR message includes an indication of the selected directional beam as well as a set of resources (e.g., time and frequency resources in the form of a grant). The UE 115 may receive the RAR message and transmit an uplink scheduling information message (e.g., Msg3) to the base station using the directional beam indicated in the RAR message and over the set of resources indicated in the RAR message. Using the techniques as described above may allow a UE 115 to efficiently determine a best beam for communication with a base station 105 during a random access procedure.

Figure 2:
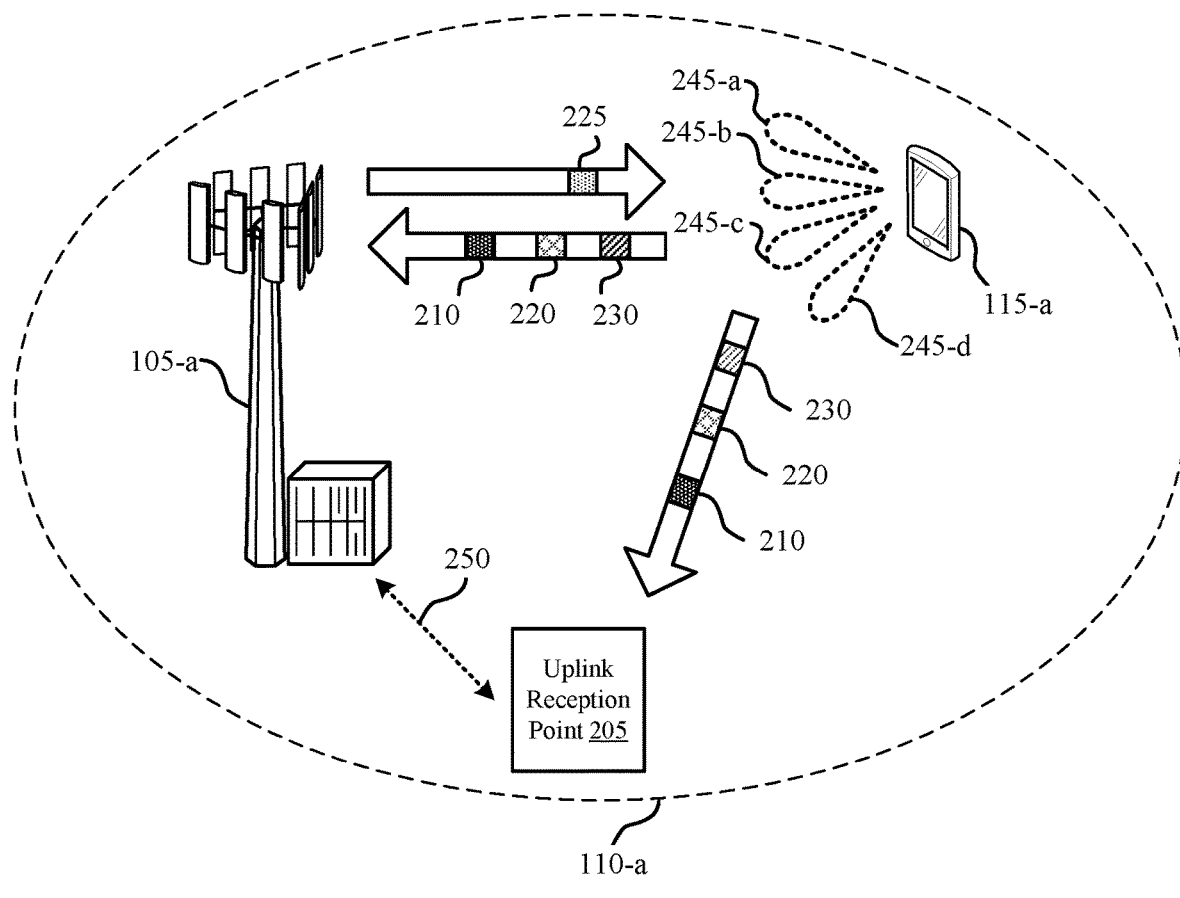

FIG. 2 illustrates an example of a wireless communications system 200 that supports uplink beam sweeping during random access procedures in accordance with aspects of the present disclosure. In some examples, the wireless communications system 200 may implement aspects of a wireless communications system 100. For example, the wireless communications system 200 may include a base station 105-a and a UE 115-a which may be examples of a base station 105 and a UE 115 as described with reference to FIG. 1. In some examples, the base station 105-a and the UE 115-a may be located within a coverage area 110-a.

In some examples, the UE 115-a may perform a random access procedure to establish a communication link with the base station 105-a. Prior to performing the random access procedure, the UE 115-a may receive a random access configuration from the network. The random access configuration may be indicated to the UE 115-a in RMSI or other signaling (e.g., broadcast signaling) and may include an indication of random access channel (RACH) occasions, parameters related to a physical RACH (PRACH) format, a preamble, etc. To initiate the random access procedure, the UE 115-a may transmit a first message 210 (e.g., Msg1) to the base station 105-a. The first message 210 may include a preamble (e.g., a preamble randomly selected by the UE 115-a or a preamble assigned to the UE 115-a by the network). Upon receiving the first message 210 from the UE 115-a, the base station 105-a may transmit a second message 225 (e.g., Msg2 or RAR message) to the UE 115-a, the second message 225 may be received over resources of a physical downlink control channel (PDCCH) which make up a RAR window and corresponding resources of a physical downlink shared channel (PDSCH). The information received over the resources of the PDCCH may be downlink control information (DCI) (e.g., DCI format 1_0) which may be CRC scrambled with an random access radio network temporary identifier (RA-RNTI) and the information received over the resources of the PDSCH may be a random access preamble ID, a timing advance, a temporary cell RNTI (TC-RNTI), and an uplink grant for a third message (e.g., frequency domain resource allocation, a time domain frequency allocation, a modulation and coding scheme, a transmit power control, etc.).

Upon receiving the second message 225 from the base station 105-a, the UE 115-a may transmit the third message 230 (e.g., Msg3) to the base station 105-a, the third message 230 may include uplink scheduling information and the exact uplink scheduling information included in the third message 230 may depend on the random access scenario (e.g., handover, radio resource control (RRC) connection establishment, initial RRC connection setup, etc.). If the random access procedure is a contention free random access (CFRA) procedure, the procedure may end with the third message 230. However, if the random access procedure is a contention-based random access (CBRA) procedure, the base station 105-a and the UE 115-a may undergo contention resolution where the UE 115-a monitors resources of the PDCCH with the TC-RNTI scheduling a transmission over resources of the PDSCH. If the UE 115-a successfully decodes the transmission over the resources of the PDSCH, the UE 115-a may set the cell RNTI (C-RNTI) equal to the TC-RNTI and transmit acknowledge feedback (e.g., HARQ-Acknowledgement (Ack) feedback) for the transmission.

In some examples, the UE 115-a may utilize the same uplink beam to transmit the first message 210 and the third message 230 to the base station 105-a. The uplink beam may be based on a previous beam selection procedure performed by the UE 115-a and the base station 105-a. During a beam selection procedure, the UE 115-a may receive a series of synchronization signal block (SSB) signals from the base station 105-a and select a directional beam to communicate with the base station 105-a that corresponds to the SSB with the highest signal strength of the series. As such, the uplink beam used by the UE 115-a to transmit the first message 210 and the third message 230 may be based on a downlink beam of the SSB that the UE 115-a detected. However, this uplink beam may not be the best beam to use for communication with the base station 105-a during a random access procedure.

In some examples, the wireless communications system 200 may support uplink dense deployment or a similar network architecture. In uplink dense deployment, the UE 115-a may transmit uplink signals to an uplink reception point 205 and the uplink reception point 205 may relay the information included in the uplink signals to the base station 105-a via a backhaul link 250. As such, during a random access procedure, the UE 115-a may transmit one or more of the first message 210 or the third message 230 to the uplink reception point 205 and the uplink reception point 205 may relay the first message 210 and the third message 230 to the base station 105-a via the backhaul link 250. The uplink reception point 205 may be utilized for uplink signals. Downlink signals (e.g., the second message or Msg2) may be transmitted to the UE 115-a from the base station 105-a. Although FIG. 2 illustrates a single uplink reception point 205, it is understood that the base station 105-a may be connected to multiple uplink reception points 205 situated in different areas of the coverage area 110-a. Uplink dense deployment may be beneficial in that it may help with uplink pathloss, traffic or load balancing, among other benefits. However, because the uplink reception points 205 may be located in a different geographic locations than the base station 105-a, the uplink beam based on the downlink beam of the SSB detected by the UE 115-a may not be the best beam for communication with the uplink reception point.

In another example, the wireless communications system 200 may support supplementary uplink. In supplementary uplink, the UE 115-*a* may be configured with two (or more) uplink carrier components and one downlink component carrier of the same serving cell. The UE 115-*a* may not transmit simultaneously on the two uplink component carriers. As such, the UE 115-*a* may transmit over an uplink component carrier that does not have a corresponding downlink component carrier in the same band. Thus, when the UE 115-*a* transmits signals (e.g., the first message 210 or the third message 230) over the uplink component carrier, the uplink beam based on the downlink beam of the SSB detected by the UE 115-*a* may not be the best beam for communication with the base station 105-*a* over the uplink component carrier.

Some existing methods of beam sweeping in the context of a random access procedure have one or more disadvantages. For example, in a first method, the UE 115-*a* may transmit repetitions of the first message 210 or the third message 230 during the random access procedure using different directional beams and select the best beam based on the repetitions. A disadvantage with this approach, however, is that the preamble included in the first message 210 is quite large and repeatedly sending the first message may consume valuable resources (e.g., over the air time and/or frequency resources). As another method, the UE 115-*a* may transmit a series of reference signals using different directional beams in a 6-step random access procedure. During the 6-step random access procedure, the UE 115-*a* may receive a Msg2a from the base station 105-*a* that indicates the resources on which to transmit a set of reference signals as well as the typical information included in the second message. In response to receiving Msg2a, the UE 115-*a* may transmit a Msg3a to the base station 105-*a*. Transmitting the Msg3a may include transmitting the set of reference signals over the set of resources using the different directional beams. The base station 105-*a* may determine an uplink beam based on the reference signals and transmit an indication of the uplink beam for the UE 115-*a* in a Msg2b. A disadvantage with this approach, however, is that the timing advance in Msg2a may not be accurate because the timing advance corresponds to the first message which is transmitted to the base station 105-*a* using the uplink beam based on the downlink beam of the SSB detected by the UE 115-*a*. In addition, introducing additional steps into the random access procedure may increase latency associated with the random access procedure.

As described herein, the UE 115-*a* may transmit a set of reference signals 220 to the base station 105-*a* following transmission of the first message 210 in a 4-step random access procedure. Prior to initiating the 4-step random access procedure, the UE 115-*a* may identify a configuration. The configuration may include parameters related to the set of reference signals 220 (e.g., time and frequency resources over which to transmit the set of reference signals), power control parameters for transmitting the set of reference signals 220, and a beam sweeping pattern for transmitting the set of reference signals 220 (e.g., a number of uplink beams to be used to transmit the reference signals). The UE 115-*a* may receive an indication of the configuration in RMSI or some other control signaling, broadcast signaling, or the like. For example, the UE 115-*a* may receive the configuration as part of the random access configuration as discussed above. In another example, the UE 115-*a* may determine the configuration using a preconfigured rule, where the preconfigured rule is based on a relationship between a UE-selected RACH occasion and preamble sequence to be used in the random access procedure.

To initiate the random access procedure, the UE may transmit the first message 210 to base station 105-*a* (or the uplink reception point 205). Upon transmitting the first message 210, the UE 115-*a* may transmit the set of reference signals 220 to the base station 105-*b* (or the uplink reception point 205) using different directional uplink beams 245 according to the configuration. For example, the UE 115-*a* may transmit the set of reference signals using at least a beam 245-*a*, a beam 245-*b*, a beam 245-*c*, and a beam 245-*d* (although the use of more or less beams is also possible). In some examples, the UE 115-*a* may transmit the first message 210 and the set of reference signals 220 without applying a timing advance. The base station 105-*a* (or the uplink reception point 205) may receive the set of reference signals 220 and select a best or most suitable beam 245. In some examples, the base station 105-*a* (or the uplink reception point 205) may measure the signal strength (e.g., reference signal received power (RSRP)) of each reference signals and determine that the best beam is the beam 245 that is associated with the reference signal with the highest signal strength of the set of reference signals 220. The base station 105-*a* may then transmit the second message 225 to the UE 115-*a*. Along with the uplink grant, the second message 225 may also include an indication of the selected beam 245. To indicate the selected beam, the second message may include an indication of the reference signals associated with the selected beams (e.g., a reference signal ID or a resource index which may correspond to an order in which the set of reference signals 220 were transmitted). The second message 225 may also indicate an uplink reception point (e.g., uplink reception point 205). Once the UE 115-*a* receives the second message 225, the UE 115-*a* may transmit the third message 230 to the base station 105-*a* (or the uplink reception point 205) using the beam 245 indicated in the second message 225.

In some examples, the UE 115-*a* may indicate to the base station 105-*a* whether or not it will utilize uplink beam sweeping during a 4-step random access procedure. To determine whether or not the UE 115-*a* will utilize beam sweeping, the UE 115-*a* may measure a signal strength (e.g., RSRP or path loss) of the downlink beam of the SSB that the UE 115-*a* detected. If the RSRP is above a threshold (e.g., a threshold configured by the network for RSRP), or if the pathloss is below a threshold (e.g., a threshold configured by the network for pathloss) the UE 115-*a* may determine to not use beam sweeping (e.g., the UE 115-*a* may instead send Msg3 using the uplink beam corresponding to the downlink beam over which the SSB was detected). Alternatively, if the RSRP is below a threshold configured for RSRP, or if the pathloss is above a threshold configured for RSRP, the UE 115-*a* may determine to use beam sweeping techniques as described herein. The signal strength threshold (e.g., RSRP threshold or path loss threshold) may be indicated to the UE 115-*a* via RMSI or some other control signaling or broadcast signaling or the like. In some examples, the random access configuration or the configuration may indicate that a portion of the total random access resources allocated to the UE 115-*a* for random access signaling may be allocated for transmission of an indication of whether the UE 115-*a* is going to be utilizing beam sweeping or not. When the UE 115-*a* decides that it may utilize uplink beam sweeping during the random access procedure, the UE 115-*a* may select a RACH occasion from the portion of resources and may transmit the first message 210 during the RACH occasion. If the base station 105-*a* receives the first message 210 during the RACH occasion within the portion of resources, it may identify that the UE 115-*a* may try different uplink beams during the random access procedure. The method as described herein may allow a UE 115-*a* to determine a suitable uplink beam for a random access procedure without consuming excess resources and introducing a delay as compared to other methods.

Figure 3:
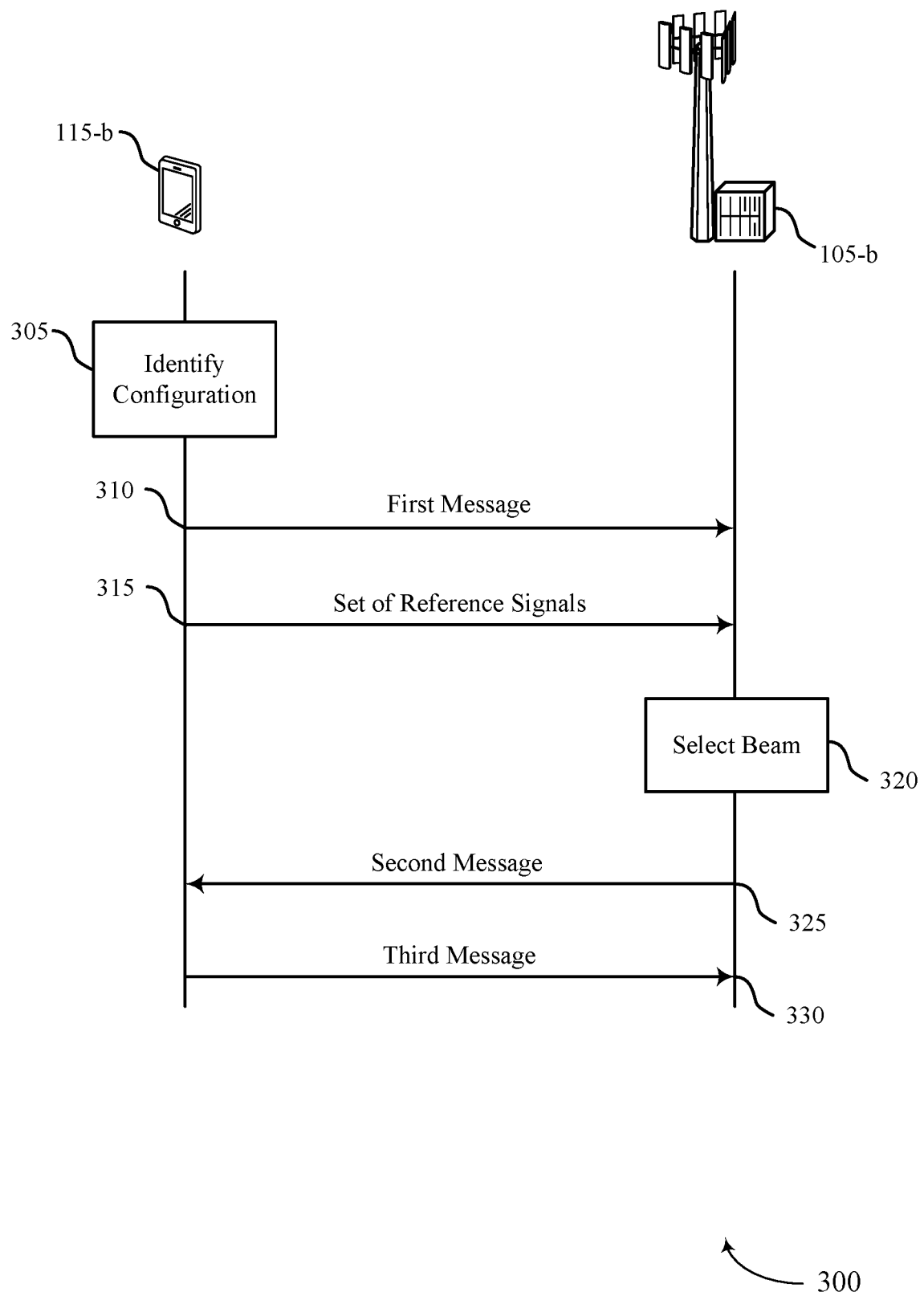
FIG. 3 illustrates an example of a process flow that supports uplink beam sweeping during random access procedures in accordance with aspects of the present disclosure.

FIG. 3 illustrates an example of a process flow 300 that supports uplink beam sweeping during random access procedures in accordance with aspects of the present disclosure. In some examples, the process flow 300 may implement aspects of a wireless communications system 100 and a wireless communications system 200. For example, the process flow 300 may be implemented by a UE 115-*b* and a base station 105-*b* which may be examples of a UE 115 and a base station 105 as described with reference to FIGS. 1 and 2. Alternative examples of the following may be implemented, where some steps are performed in a different order then described or are not performed at all. In some cases, steps may include additional features not mentioned below, or further steps may be added.

At 305, the UE 115-*b* may identify a configuration. In some examples, the UE 115-*b* may receive an indication of the configuration via RMSI or some other control signaling or broadcast signaling. In other examples, the UE 115-*b* may determine the configuration using a pre-configured rule, where the pre-configured rule is based on a relationship between a RACH occasion selected by the UE 115-*b* and a random access preamble sequence selected by the UE 115-*b* for a subsequent random access procedure. The configuration may indicate reference signal parameters, power control parameters, and beam sweeping parameters. The reference signal parameters may include an indication of a quantity of reference signals included in a set of reference signals, a time resource allocation for each reference signal of the set of reference signals, a quantity of ports (e.g., demodulation reference signal (DMRS) ports or sounding reference signal (SRS) ports), a scrambling sequence to generate the set of reference signals, a time duration between transmitting at least two consecutive reference signals of the set of reference signals, a time duration between transmitting a preamble and transmitting the first reference signal of the set of reference signals, etc. The beam sweeping parameters may include an indication of a quantity of uplink beams for transmitting the set of reference signals, a quantity of resources that are associated with the same uplink beam, an indication of a pattern of which resources are associated with the same uplink beam, etc.

In some examples, the UE 115-*b* may determine a transmit power for transmitting a preamble to the base station 105-*b* as part of the random access procedure. For the first random access attempt, a value of the transmit power may be RRC configured and included in PRACH configuration parameters (e.g., preambleReceivedTargetPower). For subsequent random access attempts, the transmit power for transmitting the preamble may be ramped up according to a step size which may also be RRC configured (e.g., PREAMBLE_POWER_RAMPING_STEP). In some examples, the UE 115-*b* may also determine a transmit power for transmitting an uplink data message (e.g., Msg3 or MsgA) after transmitting the preamble. The transmit power for transmitting the uplink data message to the base station 105-*a* may be based on the transmit power for transmitting the preamble. For example, the UE 115-*b* may calculate the transmit power for transmitting the data message based on the following parameters: P0, alpha, and pathloss. The value of P0 may be the transmit power for transmitting the preamble (e.g., preambleReceivedTargetPower) plus a power offset between a payload of the data message and the preamble transmission (e.g., msgA-DeltaPreamble), the value of alpha may be 1, and the pathloss value may be based on an SSB associated with the preamble transmission. In some examples, the same power ramp up may be applied to the data message that was applied to the preamble transmission. In some examples, the transmit power for transmitting the preamble (e.g., preambleReceivedTargetPower) may be changed depending on whether the UE 115-*b* performs beam sweeping during the random access procedure.

In some examples, the UE 115-*b* may determine a transmit power for transmitting a set of reference signals during the random access procedure based on the power control parameters indicated in the configuration. In some examples, the power control parameters may include a P0 value and an alpha value that is specific to reference signal transmissions. Alternatively, the UE 115-*b* may determine the transmit power for the set of reference signals based on the power control parameters configured for PRACH (e.g., preamble transmission). For example, the UE 115-*b* may determine the transmit power for the set of reference signals using a P0 value and an alpha value. The P0 value may be the transmit power for the preamble transmission (e.g., preambleReceivedTargetPower) plus a power offset value (e.g., ULRS-DeltaPreamble) and the alpha value may be 0. Alternatively, the base station 105-*b* may configure the UE 115-*b* with a power value per frequency unit (e.g., per resource block or per resource element). To determine the transmit power for transmitting the set of reference signals, the UE 115-*b* may scale the power value with a number of frequency units (e.g., a number of resource blocks or a number of resource elements) used to transmit the set of reference signals. In some examples, the power ramp up may be different for the reference signal transmission than the power ramp up for the preamble transmission. That is, the power of the preamble transmission may increase by 4 dB for each random access attempt, but the transmit power of the reference signal transmission may not increase or increase by 1 dB for each random access attempt.

At 310, the UE 115-*b* may transmit the first message to the base station 105-*b*. The first message may include a random access preamble. In some examples, the UE 115-*b* may transmit the preamble according to the power control parameters included in the PRACH configuration parameters.

At 315, the UE 115-*b* may transmit a set of reference signals to the base station 105-*a* using a set of directional beams. In some examples, the UE 115-*b* may transmit the set of reference signals according to the configuration identified at 305. In some examples, the set of reference signals may include a set of DMRSs or a set of SRSs among other examples.

At 320, the base station 105-*b* may select a directional beam from the set of directional beams. In some examples, the base station 105-*a* may measure the signal strength of each reference signal of the set of reference signal and select a directional beam whose associated reference signal has the highest signal strength. The base station 105-*a* may select a beam based on additional or alternative criteria such as channel quality, load or traffic balancing across the cell, among other examples.

At 325, the base station 105-*b* may transmit a second message to the UE 115-*b*. The second message may include at least an indication of a set of resources (e.g., a grant) for a third message and an indication of the selected beam.

At 330, the UE 115-b may transmit a third message to the base station 105-a. In some examples, the UE 115-b may transmit the third message using the beam indicated in the second message over the set of resources indicated in the second message.

Figure 4:
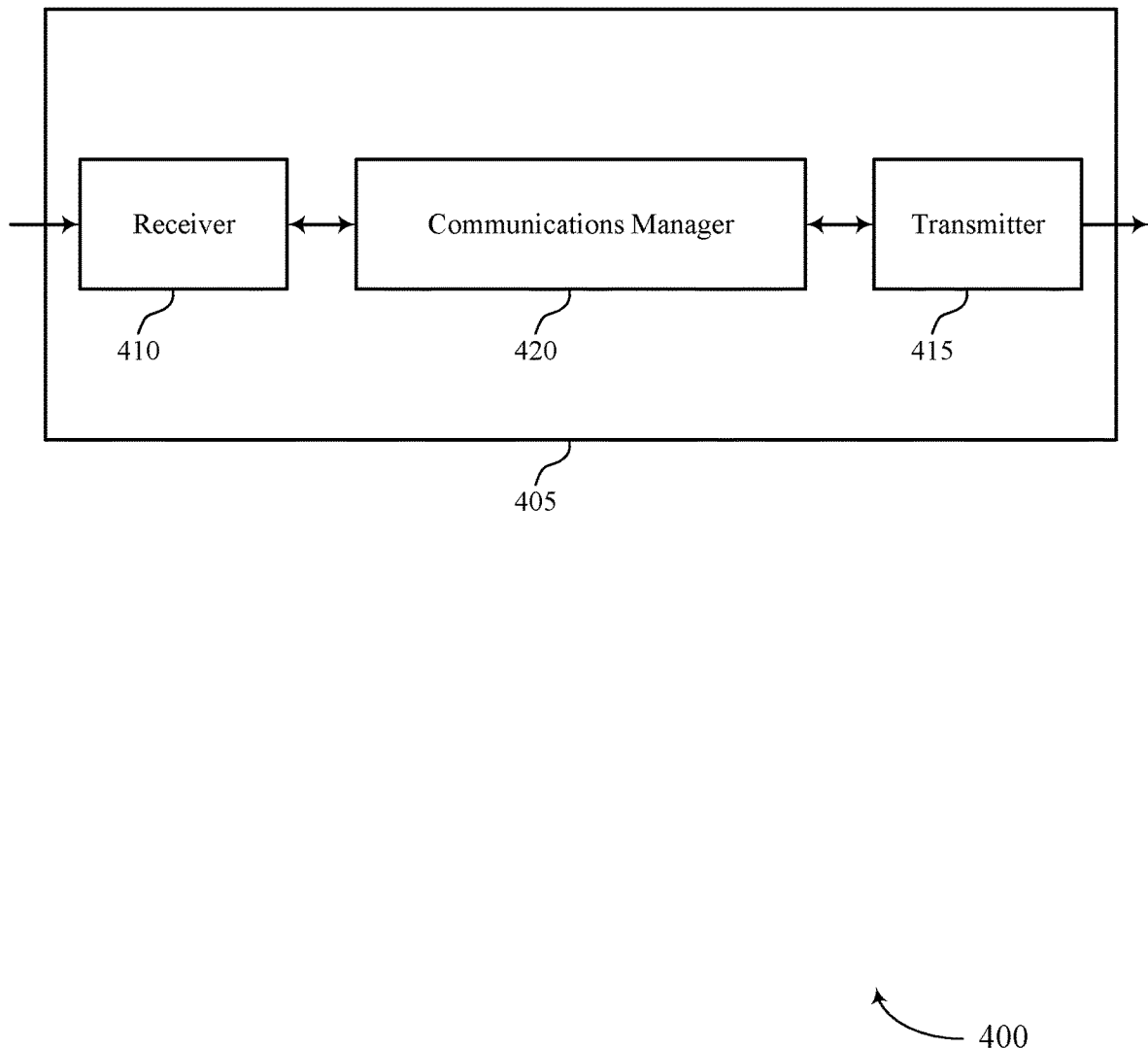
FIGS. 4 and 5 show block diagrams of devices that support uplink beam sweeping during random access procedures in accordance with aspects of the present disclosure.

FIG. 4 shows a block diagram 400 of a device 405 that supports uplink beam sweeping during random access procedures in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to uplink beam sweeping during random access procedures). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to uplink beam sweeping during random access procedures). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of uplink beam sweeping during random access procedures as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for transmitting a first message indicating at least a random access preamble for a random access procedure based on a configuration. The communications manager 420 may be configured as or otherwise support a means for transmitting a set of multiple reference signals using a set of directional beams, where transmitting the set of multiple reference signals is based on transmitting the first message. The communications manager 420 may be configured as or otherwise support a means for receiving, from a base station and as part of the random access procedure, a second message indicating a directional beam of the set of directional beams and a set of resources for transmitting a third message. The communications manager 420 may be configured as or otherwise support a means for transmitting, as part of the random access procedure, the third message over the set of resources using the indicated directional beam.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for more efficient utilization of communication resources. The method as described herein may allow a device 405 to perform uplink beam sweeping with reference signals during a random access procedure to determine an uplink beam for communication with a base station. Reference signals may not consume as many resources as other signals (e.g., a signal carrying Msg1). As such, performing uplink beam sweeping with reference signals may consume less resources when compared to performing uplink beam sweeping with other signals.

Figure 5:
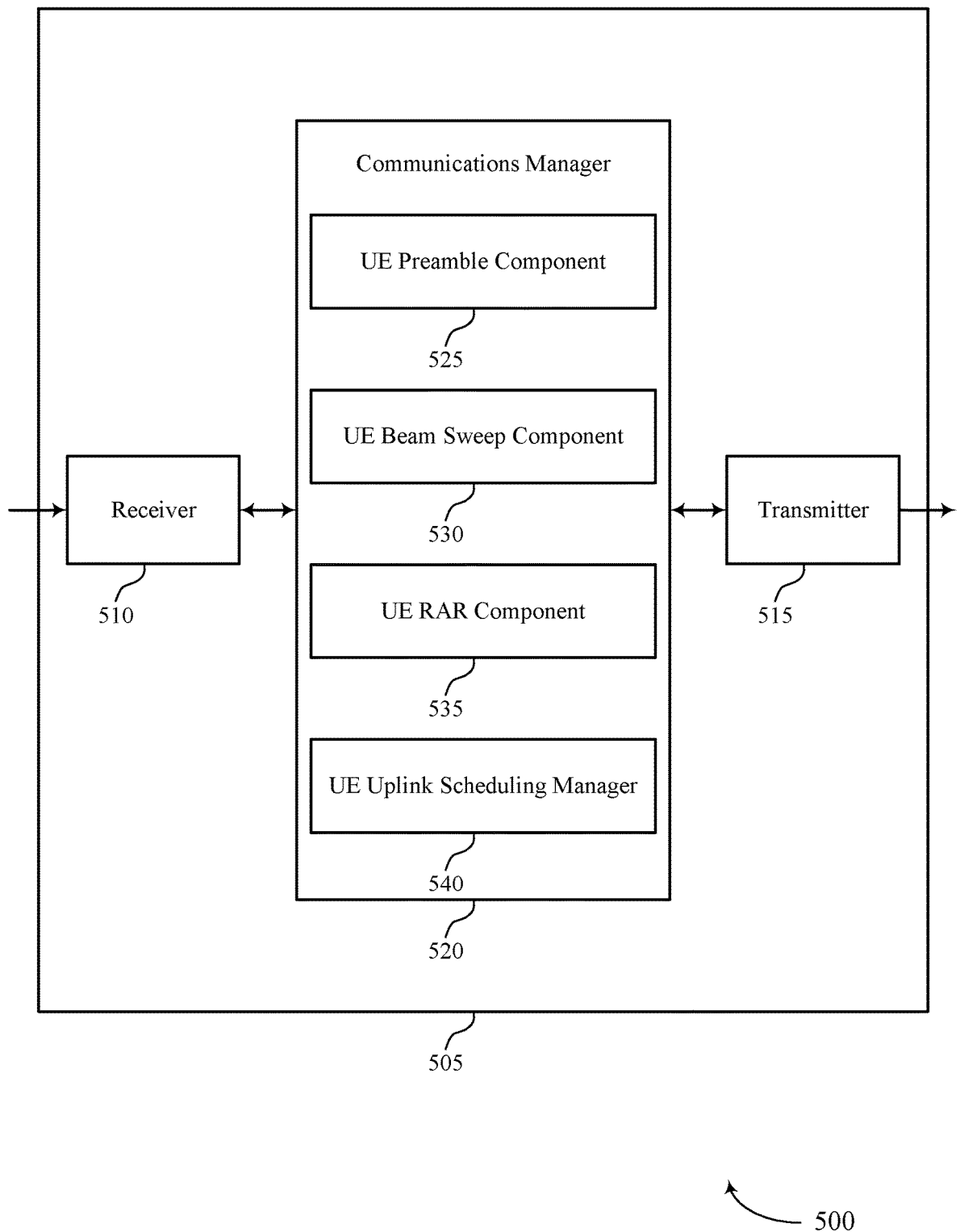

FIG. 5 shows a block diagram 500 of a device 505 that supports uplink beam sweeping during random access procedures in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to uplink beam sweeping during random access procedures). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to uplink beam sweeping during random access procedures). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of uplink beam sweeping during random access procedures as described herein. For example, the communications manager 520 may include a UE preamble component 525, a UE beam sweep component 530, a UE RAR component 535, a UE uplink scheduling manager 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The UE preamble component 525 may be configured as or otherwise support a means for transmitting a first message indicating at least a random access preamble for a random access procedure based on a configuration. The UE beam sweep component 530 may be configured as or otherwise support a means for transmitting a set of multiple reference signals using a set of directional beams, where transmitting the set of multiple reference signals is based on transmitting the first message. The UE RAR component 535 may be configured as or otherwise support a means for receiving, from a base station and as part of the random access procedure, a second message indicating a directional beam of the set of directional beams and a set of resources for transmitting a third message. The UE uplink scheduling manager 540 may be configured as or otherwise support a means for transmitting, as part of the random access procedure, the third message over the set of resources using the indicated directional beam.

Figure 6:
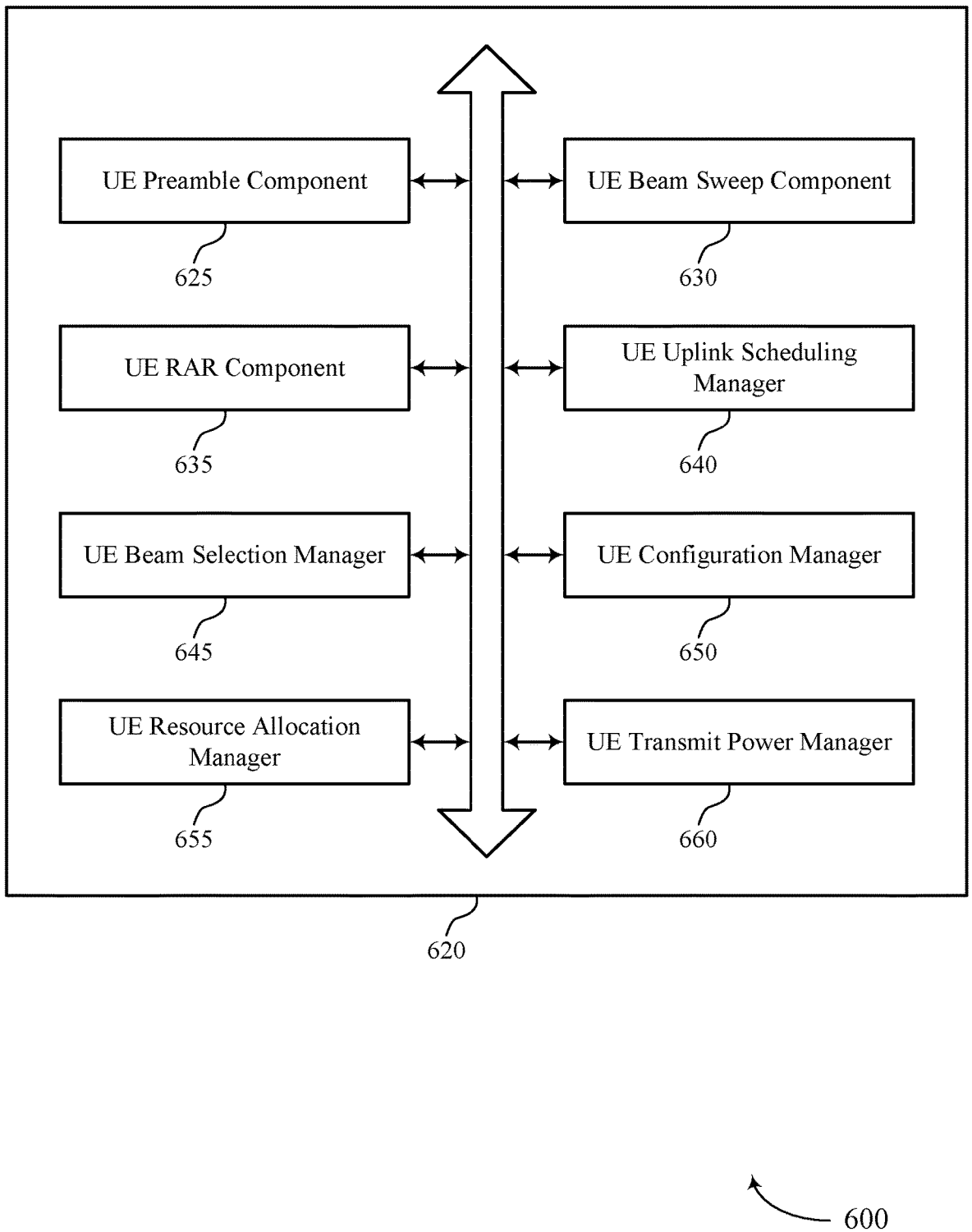
FIG. 6 shows a block diagram of a communications manager that supports uplink beam sweeping during random access procedures in accordance with aspects of the present disclosure.

FIG. 6 shows a block diagram 600 of a communications manager 620 that supports uplink beam sweeping during random access procedures in accordance with aspects of the present disclosure. The communications manager 620 may be an example of aspects of a communications manager 420, a communications manager 520, or both, as described herein. The communications manager 620, or various components thereof, may be an example of means for performing various aspects of uplink beam sweeping during random access procedures as described herein. For example, the communications manager 620 may include a UE preamble component 625, a UE beam sweep component 630, a UE RAR component 635, a UE uplink scheduling manager 640, a UE beam selection manager 645, a UE configuration manager 650, a UE resource allocation manager 655, a UE transmit power manager 660, or any combination thereof. Each of these components may communicate, directly or indirectly, with one another (e.g., via one or more buses).

The communications manager 620 may support wireless communication at a UE in accordance with examples as disclosed herein. The UE preamble component 625 may be configured as or otherwise support a means for transmitting a first message indicating at least a random access preamble for a random access procedure based on a configuration. The UE beam sweep component 630 may be configured as or otherwise support a means for transmitting a set of multiple reference signals using a set of directional beams, where transmitting the set of multiple reference signals is based on transmitting the first message. The UE RAR component 635 may be configured as or otherwise support a means for receiving, from a base station and as part of the random access procedure, a second message indicating a directional beam of the set of directional beams and a set of resources for transmitting a third message. The UE uplink scheduling manager 640 may be configured as or otherwise support a means for transmitting, as part of the random access procedure, the third message over the set of resources using the indicated directional beam.

In some examples, the UE beam selection manager 645 may be configured as or otherwise support a means for performing a beam selection procedure with the base station prior to transmitting the first message. In some examples, the UE beam selection manager 645 may be configured as or otherwise support a means for identifying a second directional beam based on performing the beam selection procedure, where the first message is transmitted using the second directional beam.

In some examples, the UE beam selection manager 645 may be configured as or otherwise support a means for determining whether a signal strength value associated with the second directional beam satisfies a threshold, where transmitting the set of multiple reference signals is based on the signal strength value satisfying the threshold. In some examples, the directional beam is different from the second directional beam.

In some examples, the configuration indicates a set of parameters associated with the set of multiple reference signals, the set of parameters including an indication of a quantity of reference signals, a second set of resources for transmitting each reference signal of the set of multiple reference signals, a quantity of DMRS ports for transmitting the set of multiple reference signals, a quantity of SRS ports for transmitting the set of multiple reference signals, a scrambling sequence to generate the set of multiple reference signals, a time duration between transmitting a first reference signal of the set of multiple reference signals and transmitting a second reference signal of the set of multiple reference signals, a time duration between transmitting the first message and transmitting a reference signal of the set of multiple reference signals, or a combination thereof.

In some examples, the configuration indicates a beam sweeping pattern for transmitting the set of multiple reference signals, the beam sweeping pattern including an indication of a quantity of directional beams, a quantity of resources associated with the same directional beam, a pattern as to which resources are associated with the same directional beam, or a combination thereof.

In some examples, the configuration indicates power control parameters for transmitting the set of multiple reference signals, the power control parameters including an indication of an initial power value, a secondary power value, a power offset value with respect to power control parameters for transmitting the first message, a power ramp up value for each subsequent random access attempts, or a combination thereof.

In some examples, the UE configuration manager 650 may be configured as or otherwise support a means for receiving, from the base station, the configuration via RMSI. In some examples, the UE configuration manager 650 may be configured as or otherwise support a means for determining the configuration using a preconfigured rule, the preconfigured rule based on a relationship between a random access occasion and a sequence associated with the random access preamble selected by the UE for the random access procedure.

In some examples, the UE resource allocation manager 655 may be configured as or otherwise support a means for receiving, from the base station, system information signaling indicating a subset of a second set of resources allocated for random access signaling, where the first message is transmitted over the subset of resources; and where transmitting the set of multiple reference signals is based on transmitting the first message over the subset of resources.

In some examples, the UE transmit power manager 660 may be configured as or otherwise support a means for increasing a transmit power for a retransmission of the first message by a first amount based on the random access procedure failing. In some examples, the UE transmit power manager 660 may be configured as or otherwise support a means for increasing a transmit power for a retransmission of the set of reference signals by a second amount based on the random access procedure failing, where the first amount is different than the second amount.

In some examples, to support receiving the second message indicating the directional beam, the UE RAR component 635 may be configured as or otherwise support a means for receiving an indication of a resource identifier associated with a reference signal of the set of multiple reference signals corresponding to the directional beam or a resource index of a set of resource indices, the set of resource indices corresponding to an order in which the set of multiple reference signals are transmitted.

In some examples, one or both of the first message and the set of multiple reference signals are transmitted without a timing advance.

In some examples, the set of multiple reference signals includes a set of multiple DMRSs or a set of multiple SRSs.

Figure 7:
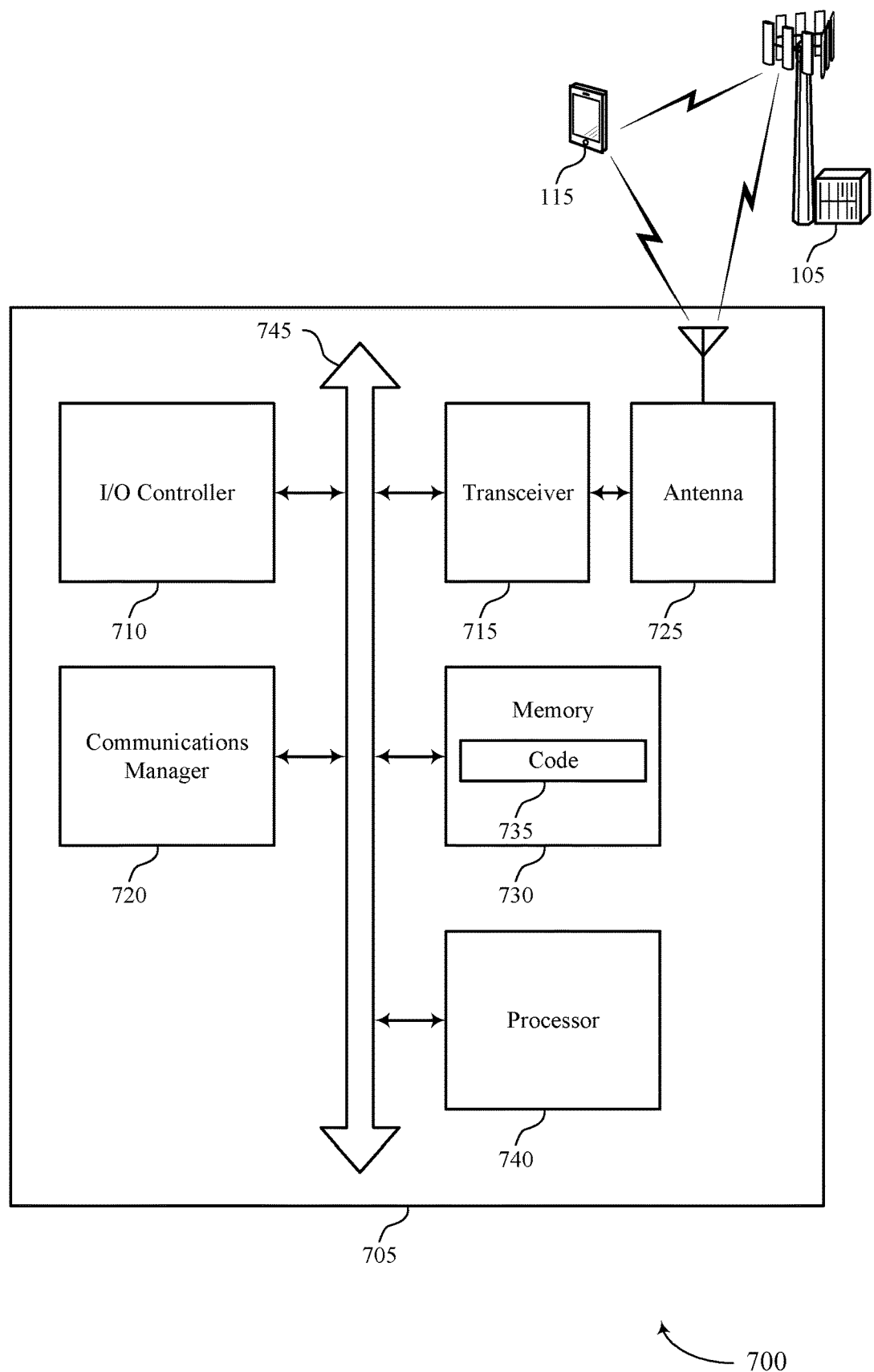
FIG. 7 shows a diagram of a system including a device that supports uplink beam sweeping during random access procedures in accordance with aspects of the present disclosure.

FIG. 7 shows a diagram of a system 700 including a device 705 that supports uplink beam sweeping during random access procedures in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting uplink beam sweeping during random access procedures). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for transmitting a first message indicating at least a random access preamble for a random access procedure based on a configuration. The communications manager 720 may be configured as or otherwise support a means for transmitting a set of multiple reference signals using a set of directional beams, where transmitting the set of multiple reference signals is based on transmitting the first message. The communications manager 720 may be configured as or otherwise support a means for receiving, from a base station and as part of the random access procedure, a second message indicating a directional beam of the set of directional beams and a set of resources for transmitting a third message. The communications manager 720 may be configured as or otherwise support a means for transmitting, as part of the random access procedure, the third message over the set of resources using the indicated directional beam.

By including or configuring the communications manager 720 in accordance with examples as described herein, the device 705 may support techniques for reduced power consumption. In some examples, the device 705 may perform the methods as described herein as part of a 4-step random access procedure. Performing the methods as described herein may be more power efficient than other methods that suggest using a 6-step random access procedure. That is, a 4-step random access procedure may include less signaling back and forth between the device 705 and a base station than a 6-step random access procedure thus requiring less signal processing by the device 705.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of uplink beam sweeping during random access procedures as described herein, or the processor 740 and the memory 730 may be otherwise configured to perform or support such operations.

Figure 8:
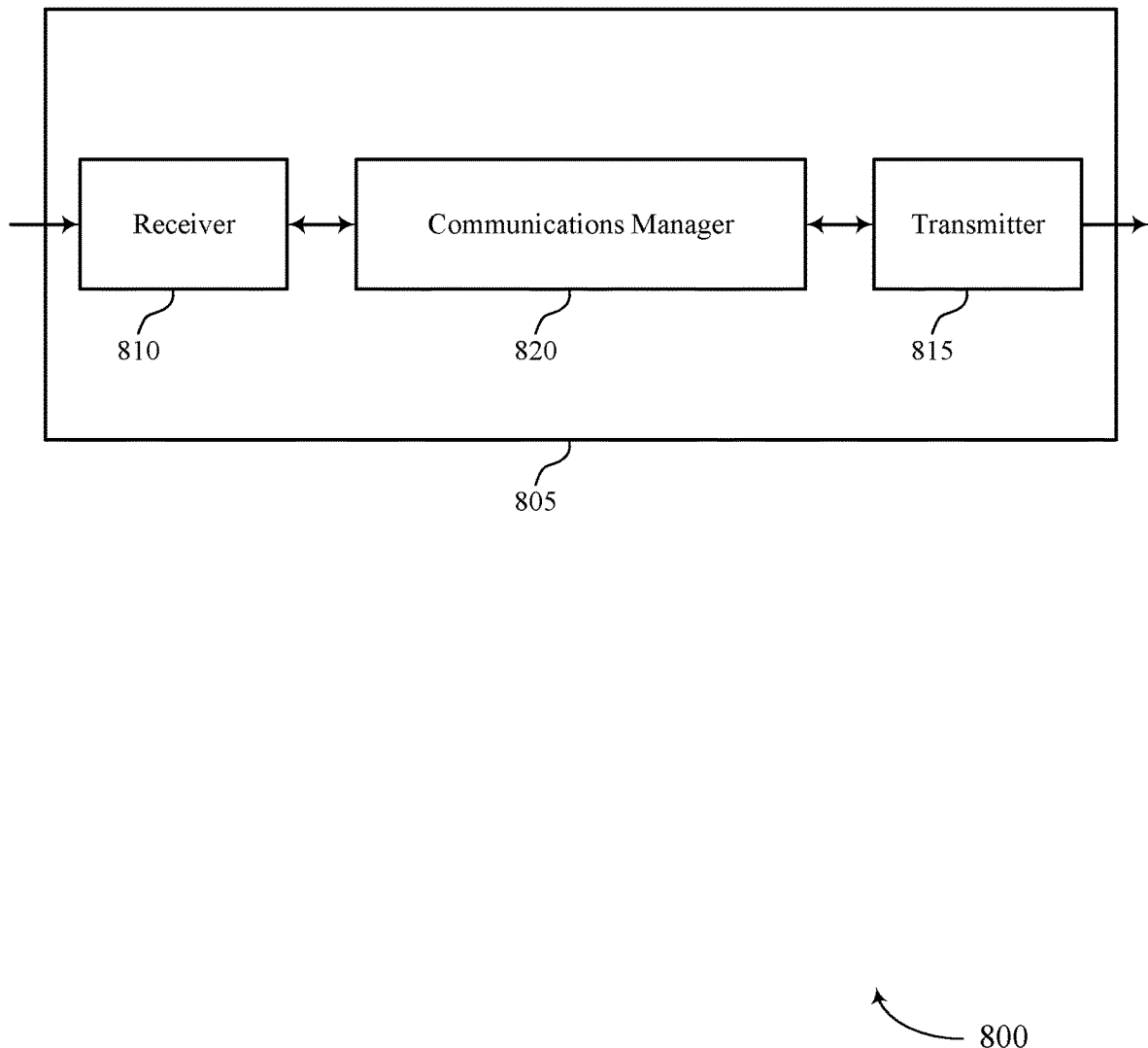
FIGS. 8 and 9 show block diagrams of devices that support uplink beam sweeping during random access procedures in accordance with aspects of the present disclosure.

FIG. 8 shows a block diagram 800 of a device 805 that supports uplink beam sweeping during random access procedures in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to uplink beam sweeping during random access procedures). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to uplink beam sweeping during random access procedures). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of uplink beam sweeping during random access procedures as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting, to a UE, a configuration for transmitting random access signaling. The communications manager 820 may be configured as or otherwise support a means for receiving a first message indicating at least a random access preamble for a random access procedure based on the configuration. The communications manager 820 may be configured as or otherwise support a means for selecting a directional beam from a set of directional beams, the set of directional beams associated with a set of multiple reference signals transmitted at the UE. The communications manager 820 may be configured as or otherwise support a means for transmitting, to the UE, a second message indicating the selected directional beam and a set of resources for transmitting a third message.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources.

Figure 9:
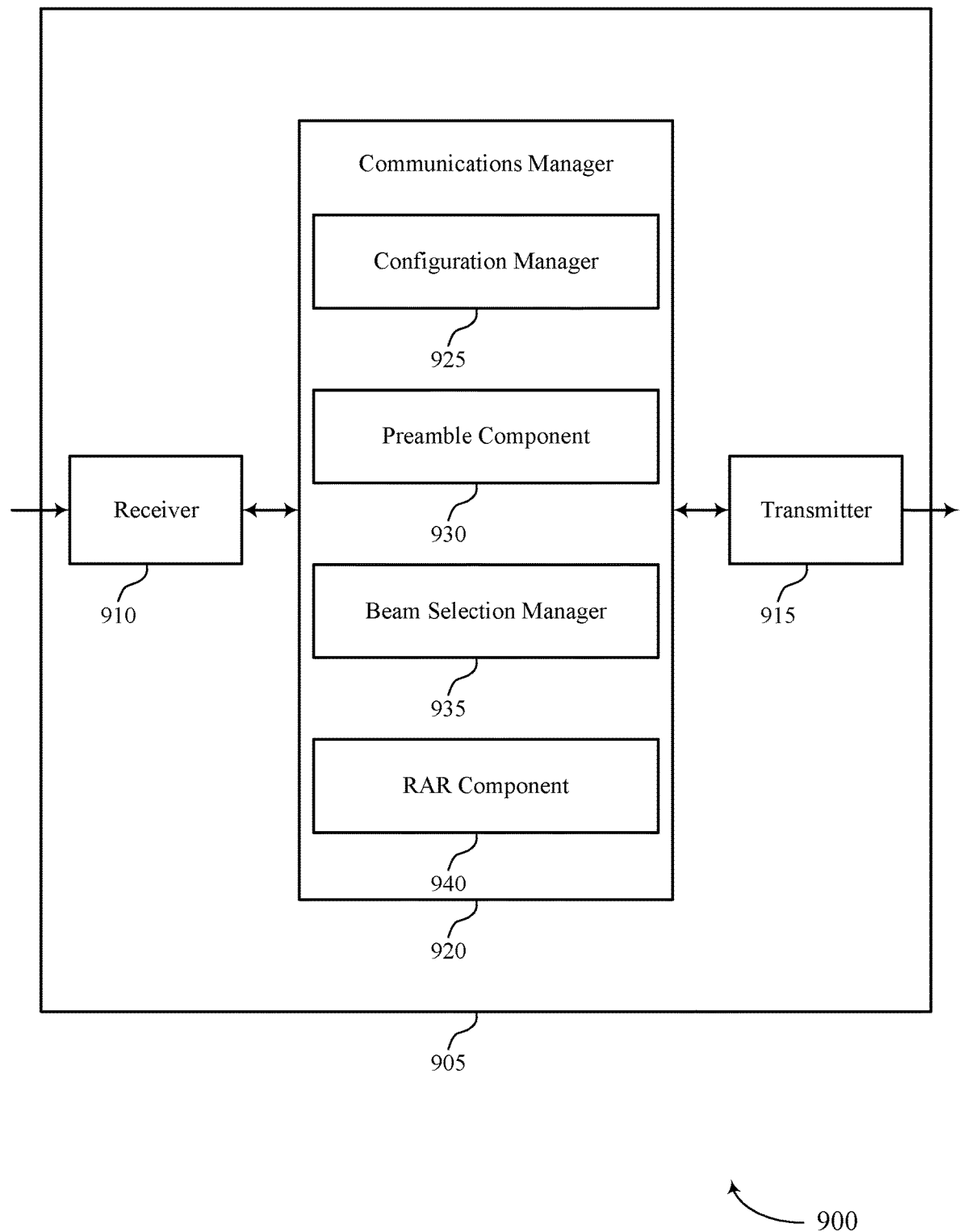

FIG. 9 shows a block diagram 900 of a device 905 that supports uplink beam sweeping during random access procedures in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to uplink beam sweeping during random access procedures). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to uplink beam sweeping during random access procedures). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of uplink beam sweeping during random access procedures as described herein. For example, the communications manager 920 may include a configuration manager 925, a preamble component 930, a beam selection manager 935, a RAR component 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The configuration manager 925 may be configured as or otherwise support a means for transmitting, to a UE, a configuration for transmitting random access signaling. The preamble component 930 may be configured as or otherwise support a means for receiving a first message indicating at least a random access preamble for a random access procedure based on the configuration. The beam selection manager 935 may be configured as or otherwise support a means for selecting a directional beam from a set of directional beams, the set of directional beams associated with a set of multiple reference signals transmitted at the UE. The RAR component 940 may be configured as or otherwise support a means for transmitting, to the UE, a second message indicating the selected directional beam and a set of resources for transmitting a third message.

Figure 10:
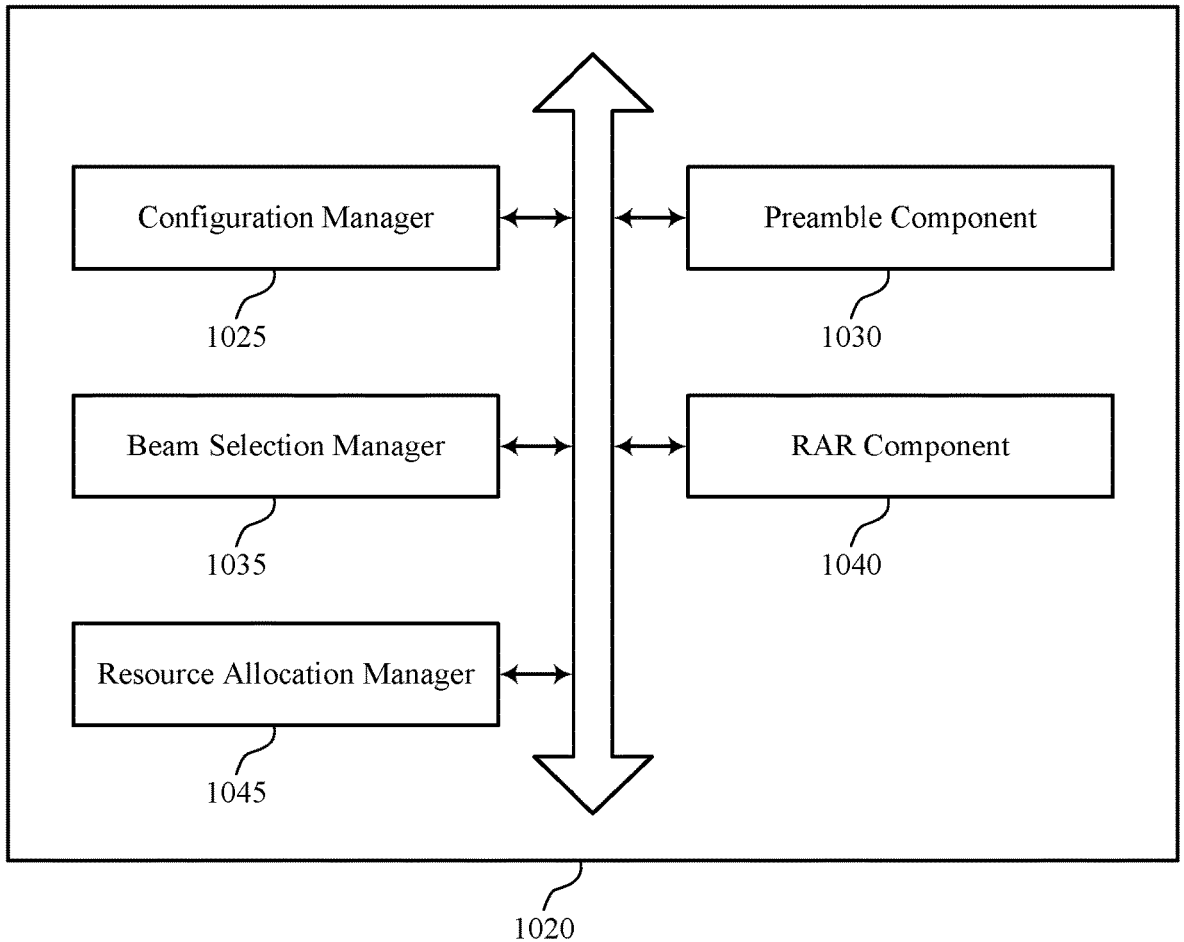
FIG. 10 shows a block diagram of a communications manager that supports uplink beam sweeping during random access procedures in accordance with aspects of the present disclosure.

FIG. 10 shows a block diagram 1000 of a communications manager 1020 that supports uplink beam sweeping during random access procedures in accordance with aspects of the present disclosure. The communications manager 1020 may be an example of aspects of a communications manager 820, a communications manager 920, or both, as described herein. The communications manager 1020, or various components thereof, may be an example of means for performing various aspects of uplink beam sweeping during random access procedures as described herein. For example, the communications manager 1020 may include a configuration manager 1025, a preamble component 1030, a beam selection manager 1035, a RAR component 1040, a resource allocation manager 1045, or any combination thereof. Each of these components may communicate, directly or indirectly, with one another (e.g., via one or more buses).

The communications manager 1020 may support wireless communication at a base station in accordance with examples as disclosed herein. The configuration manager 1025 may be configured as or otherwise support a means for transmitting, to a UE, a configuration for transmitting random access signaling. The preamble component 1030 may be configured as or otherwise support a means for receiving a first message indicating at least a random access preamble for a random access procedure based on the configuration. The beam selection manager 1035 may be configured as or otherwise support a means for selecting a directional beam from a set of directional beams, the set of directional beams associated with a set of multiple reference signals transmitted at the UE. The RAR component 1040 may be configured as or otherwise support a means for transmitting, to the UE, a second message indicating the selected directional beam and a set of resources for transmitting a third message.

In some examples, the beam selection manager 1035 may be configured as or otherwise support a means for performing a beam selection procedure with the UE prior to receiving the first message. In some examples, the beam selection manager 1035 may be configured as or otherwise support a means for selecting a second directional beam based on performing the beam selection procedure.

In some examples, the directional beam is different from the second directional beam.

In some examples, the configuration indicates a set of parameters associated with the set of multiple reference signals, the set of parameters including an indication of a quantity of reference signals, a second set of resources for transmitting each reference signal of the set of multiple reference signals, a quantity of DMRS ports for transmitting the set of multiple reference signals, a quantity of SRS ports for transmitting the set of multiple reference signals, a scrambling sequence to generate the set of multiple reference signals, a time duration between the UE transmitting a first reference signal of the set of multiple reference signals and transmitting a second reference signal of the set of multiple reference signals, a time duration between the UE transmitting the first message and transmitting a reference signal of the set of multiple reference signals, or a combination thereof.

In some examples, the configuration indicates a beam sweeping pattern for transmitting the set of multiple reference signals, the beam sweeping pattern including an indication of a quantity of directional beams, a quantity of resources associated with the same directional beam, a pattern as to which resources are associated with the same directional beam, or a combination thereof.

In some examples, the configuration indicates power control parameters for transmitting the set of multiple reference signals, the power control parameters including an indication of an initial power value, a secondary power value, a power offset value with respect to power control parameters for transmitting the first message, a power ramp up value for each subsequent random access attempts, or a combination thereof.

In some examples, to support transmitting the configuration, the configuration manager 1025 may be configured as or otherwise support a means for transmitting, to the UE, RMSI, the RMSI including the configuration.

In some examples, the resource allocation manager 1045 may be configured as or otherwise support a means for transmitting, to the UE, system information signaling indicating a subset of a second set of resources allocated for random access signaling, where the first message is received over the subset of resources; and where the directional beam is selected based on receiving the first message over the subset of resources.

In some examples, to support transmitting the second message indicating the directional beam, the RAR component 1040 may be configured as or otherwise support a means for transmitting an indication of a resource identifier associated with a reference signal of the set of multiple reference signals corresponding to the directional beam or a resource index of a set of resource indices, the set of resource indices corresponding to an order in which the set of multiple reference signals are transmitted.

In some examples, one or both of the first message and the set of multiple reference signals do not have an applied timing advance.

In some examples, the set of multiple reference signals includes a set of multiple DMRSs or a set of multiple SRSs.

Figure 11:
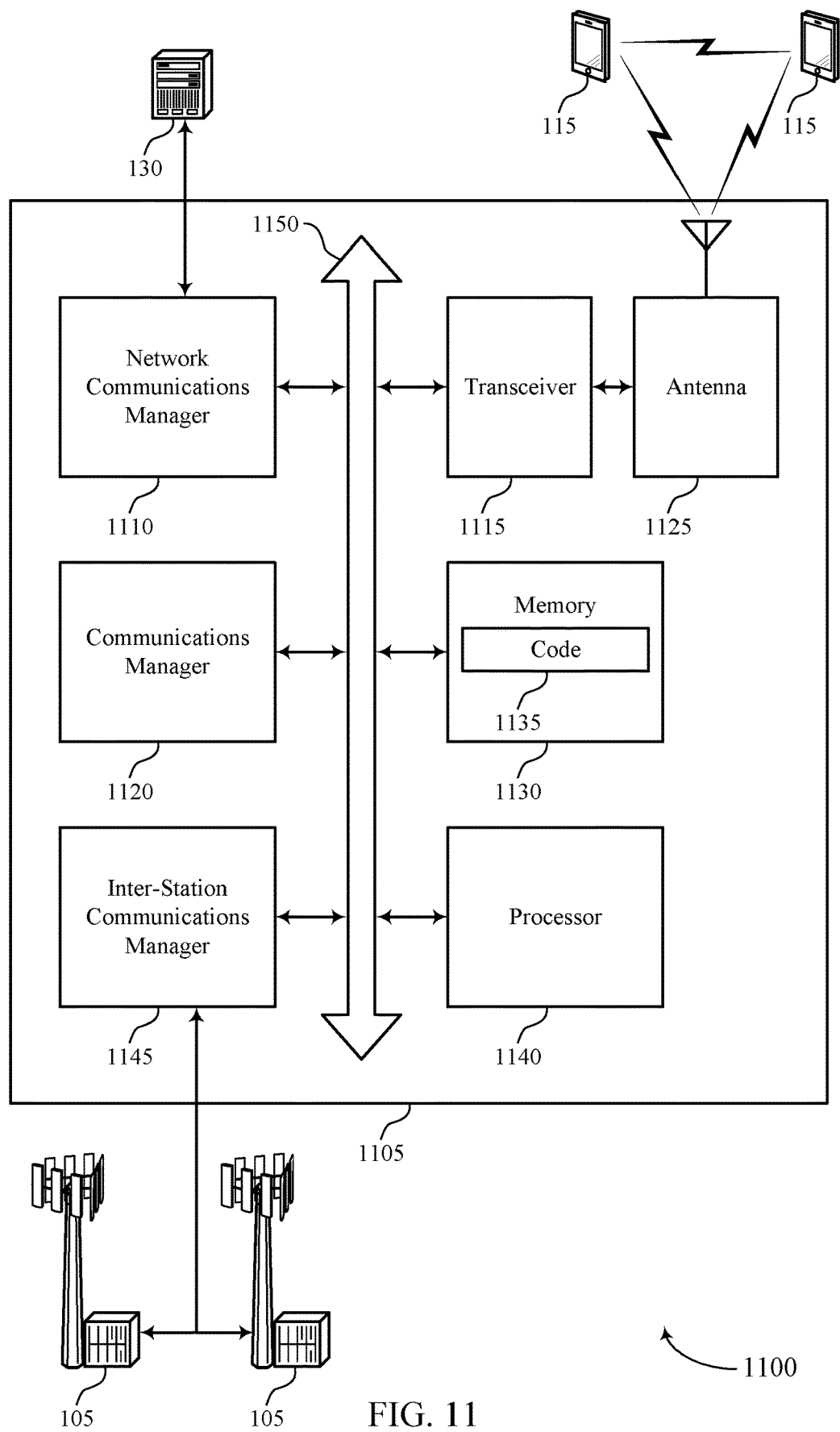
FIG. 11 shows a diagram of a system including a device that supports uplink beam sweeping during random access procedures in accordance with aspects of the present disclosure.

FIG. 11 shows a diagram of a system 1100 including a device 1105 that supports uplink beam sweeping during random access procedures in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink beam sweeping during random access procedures). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting, to a UE, a configuration for transmitting random access signaling. The communications manager 1120 may be configured as or otherwise support a means for receiving a first message indicating at least a random access preamble for a random access procedure based on the configuration. The communications manager 1120 may be configured as or otherwise support a means for selecting a directional beam from a set of directional beams, the set of directional beams associated with a set of multiple reference signals transmitted at the UE. The communications manager 1120 may be configured as or otherwise support a means for transmitting, to the UE, a second message indicating the selected directional beam and a set of resources for transmitting a third message.

By including or configuring the communications manager 1120 in accordance with examples as described herein, the device 1105 may support techniques for reduced power consumption.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of uplink beam sweeping during random access procedures as described herein, or the processor 1140 and the memory 1130 may be otherwise configured to perform or support such operations.

Figure 12:
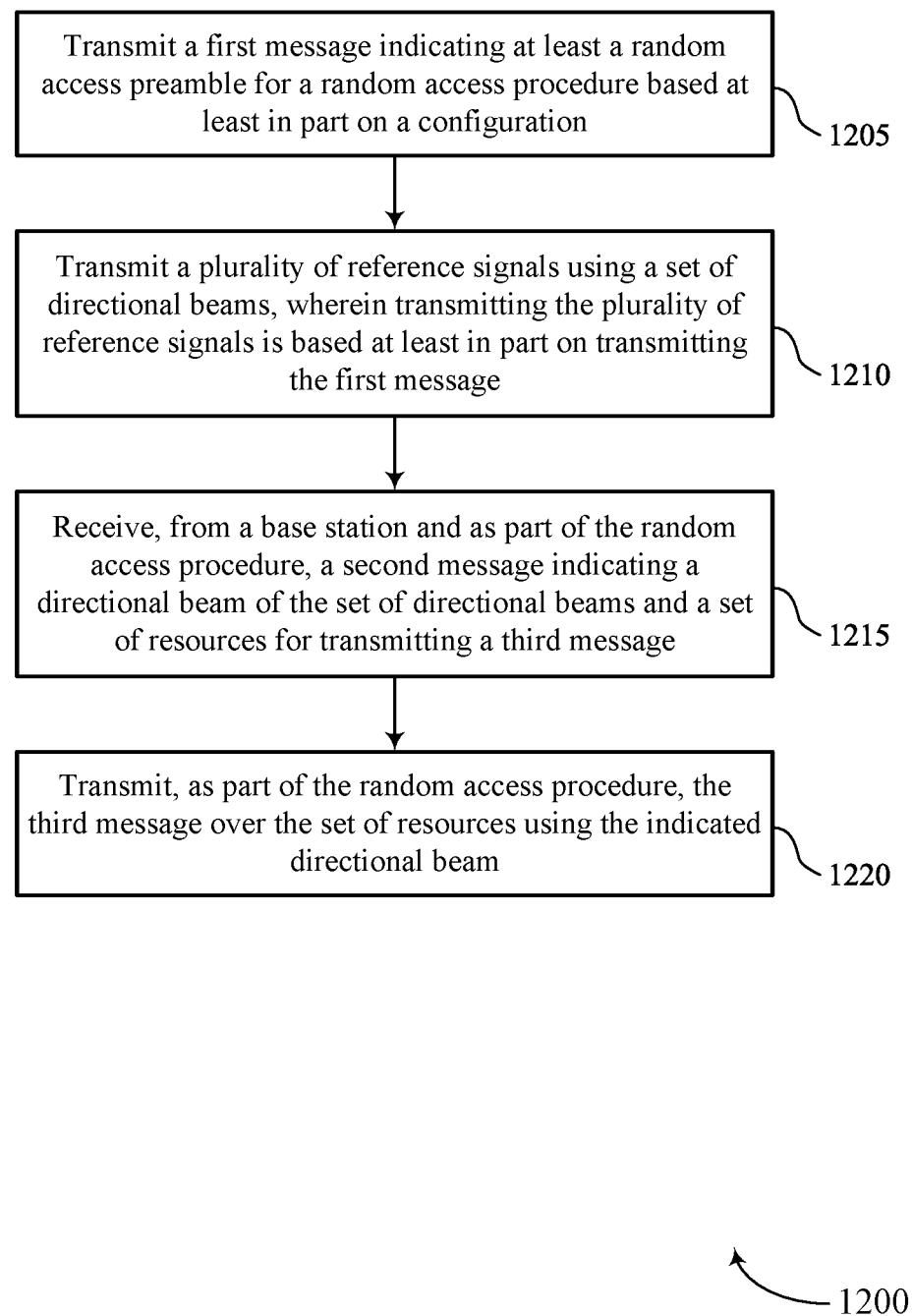
FIGS. 12 through 17 show flowcharts illustrating methods that support uplink beam sweeping during random access procedures in accordance with aspects of the present disclosure.

FIG. 12 shows a flowchart illustrating a method 1200 that supports uplink beam sweeping during random access procedures in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include transmitting a first message indicating at least a random access preamble for a random access procedure based on a configuration. The operations of 1205 may be performed in accordance with examples as disclosed herein. In some examples, aspects of the operations of 1205 may be performed by a UE preamble component 625 as described with reference to FIG. 6.

At 1210, the method may include transmitting a set of multiple reference signals using a set of directional beams, where transmitting the set of multiple reference signals is based on transmitting the first message. The operations of 1210 may be performed in accordance with examples as disclosed herein. In some examples, aspects of the operations of 1210 may be performed by a UE beam sweep component 630 as described with reference to FIG. 6.

At 1215, the method may include receiving, from a base station and as part of the random access procedure, a second message indicating a directional beam of the set of directional beams and a set of resources for transmitting a third message. The operations of 1215 may be performed in accordance with examples as disclosed herein. In some examples, aspects of the operations of 1215 may be performed by a UE RAR component 635 as described with reference to FIG. 6.

At 1220, the method may include transmitting, as part of the random access procedure, the third message over the set of resources using the indicated directional beam. The operations of 1220 may be performed in accordance with examples as disclosed herein. In some examples, aspects of the operations of 1220 may be performed by a UE uplink scheduling manager 640 as described with reference to FIG. 6.

Figure 13:
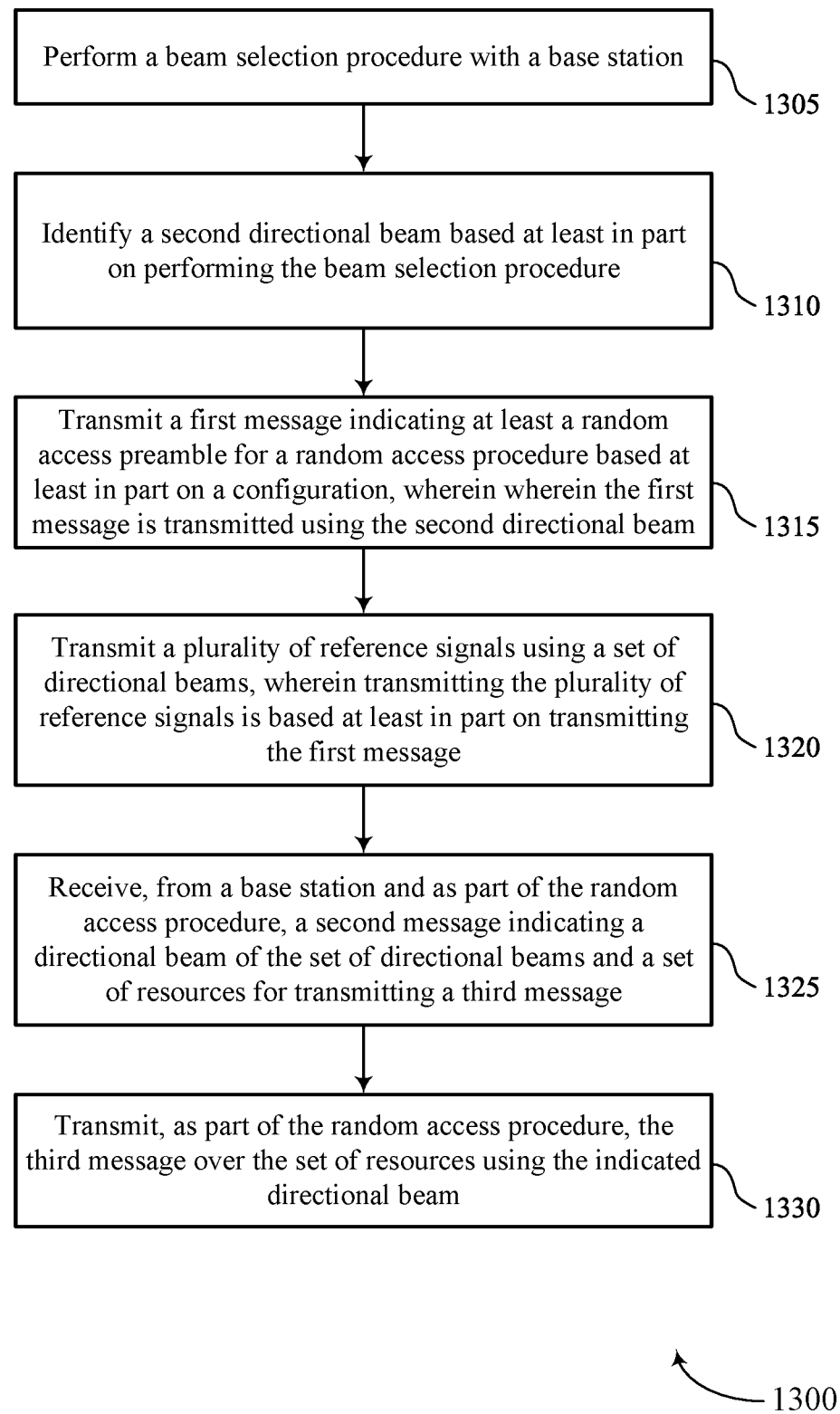

FIG. 13 shows a flowchart illustrating a method 1300 that supports uplink beam sweeping during random access procedures in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include performing a beam selection procedure with the base station. The operations of 1305 may be performed in accordance with examples as disclosed herein. In some examples, aspects of the operations of 1305 may be performed by a UE beam selection manager 645 as described with reference to FIG. 6.

At 1310, the method may include identifying a second directional beam based on performing the beam selection procedure. The operations of 1310 may be performed in accordance with examples as disclosed herein. In some examples, aspects of the operations of 1310 may be performed by a UE beam selection manager 645 as described with reference to FIG. 6.

At 1315, the method may include transmitting a first message indicating at least a random access preamble for a random access procedure based on a configuration, where the first message is transmitted using the second directional beam. The operations of 1315 may be performed in accordance with examples as disclosed herein. In some examples, aspects of the operations of 1315 may be performed by a UE preamble component 625 as described with reference to FIG. 6.

At 1320, the method may include transmitting a set of multiple reference signals using a set of directional beams, where transmitting the set of multiple reference signals is based on transmitting the first message. The operations of 1320 may be performed in accordance with examples as disclosed herein. In some examples, aspects of the operations of 1320 may be performed by a UE beam sweep component 630 as described with reference to FIG. 6.

At 1325, the method may include receiving, from a base station and as part of the random access procedure, a second message indicating a directional beam of the set of directional beams and a set of resources for transmitting a third message. The operations of 1325 may be performed in accordance with examples as disclosed herein. In some examples, aspects of the operations of 1325 may be performed by a UE RAR component 635 as described with reference to FIG. 6.

At 1330, the method may include transmitting, as part of the random access procedure, the third message over the set of resources using the indicated directional beam. The operations of 1330 may be performed in accordance with examples as disclosed herein. In some examples, aspects of the operations of 1330 may be performed by a UE uplink scheduling manager 640 as described with reference to FIG. 6.

Figure 14:
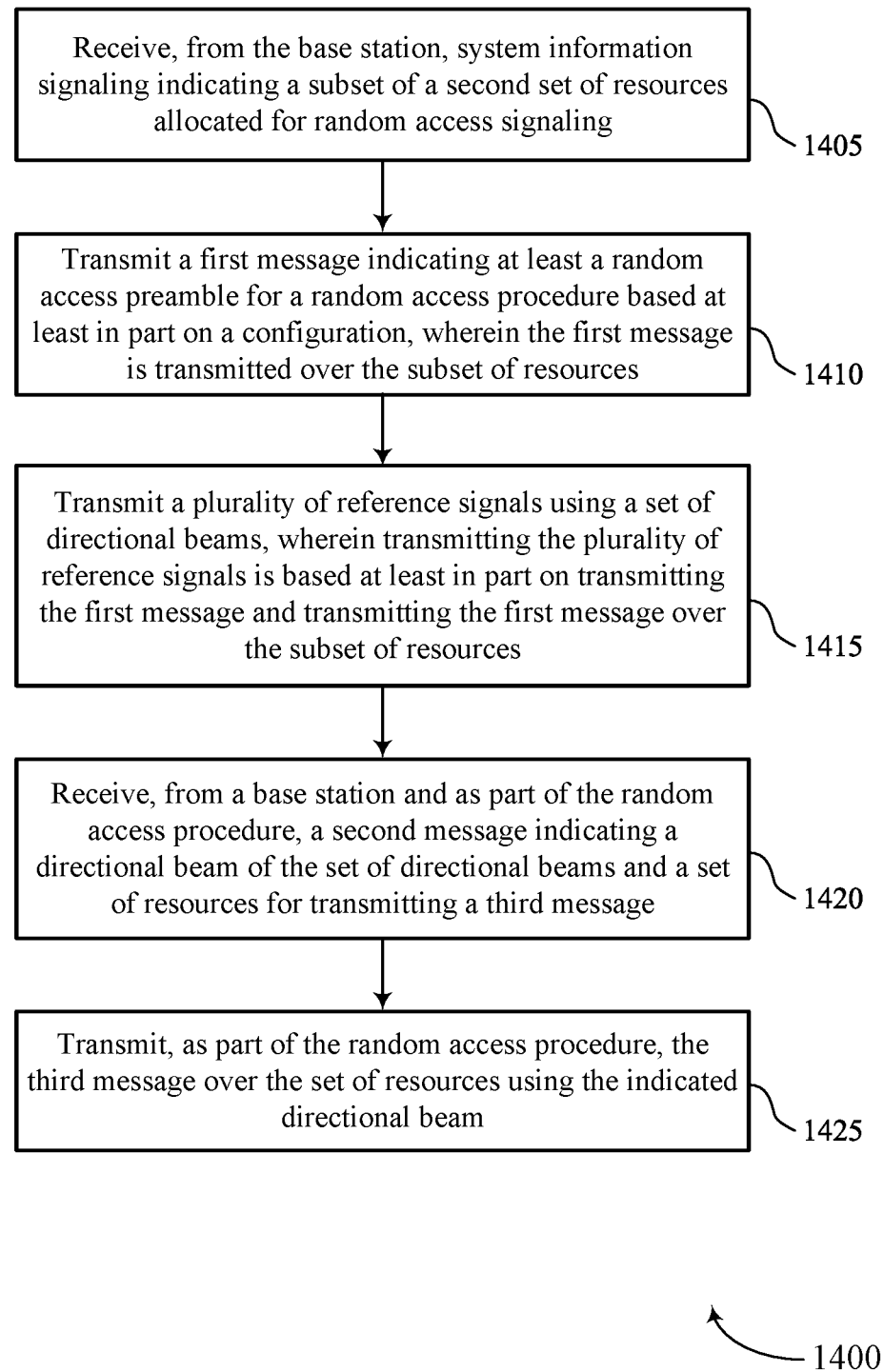

FIG. 14 shows a flowchart illustrating a method 1400 that supports uplink beam sweeping during random access procedures in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from the base station, system information signaling indicating a subset of a second set of resources allocated for random access signaling. The operations of 1405 may be performed in accordance with examples as disclosed herein. In some examples, aspects of the operations of 1405 may be performed by a UE resource allocation manager 655 as described with reference to FIG. 6.

At 1410, the method may include transmitting a first message indicating at least a random access preamble for a random access procedure based on a configuration, where the first message is transmitted over the subset of resources. The operations of 1410 may be performed in accordance with examples as disclosed herein. In some examples, aspects of the operations of 1410 may be performed by a UE preamble component 625 as described with reference to FIG. 6.

At 1415, the method may include transmitting a set of multiple reference signals using a set of directional beams, where transmitting the set of multiple reference signals is based on transmitting the first message and transmitting the first message over the subset of resources. The operations of 1415 may be performed in accordance with examples as disclosed herein. In some examples, aspects of the operations of 1415 may be performed by a UE beam sweep component 630 as described with reference to FIG. 6.

At 1420, the method may include receiving, from a base station and as part of the random access procedure, a second message indicating a directional beam of the set of directional beams and a set of resources for transmitting a third message. The operations of 1420 may be performed in accordance with examples as disclosed herein. In some examples, aspects of the operations of 1420 may be performed by a UE RAR component 635 as described with reference to FIG. 6.

At 1425, the method may include transmitting, as part of the random access procedure, the third message over the set of resources using the indicated directional beam. The operations of 1425 may be performed in accordance with examples as disclosed herein. In some examples, aspects of the operations of 1425 may be performed by a UE uplink scheduling manager 640 as described with reference to FIG. 6.

Figure 15:
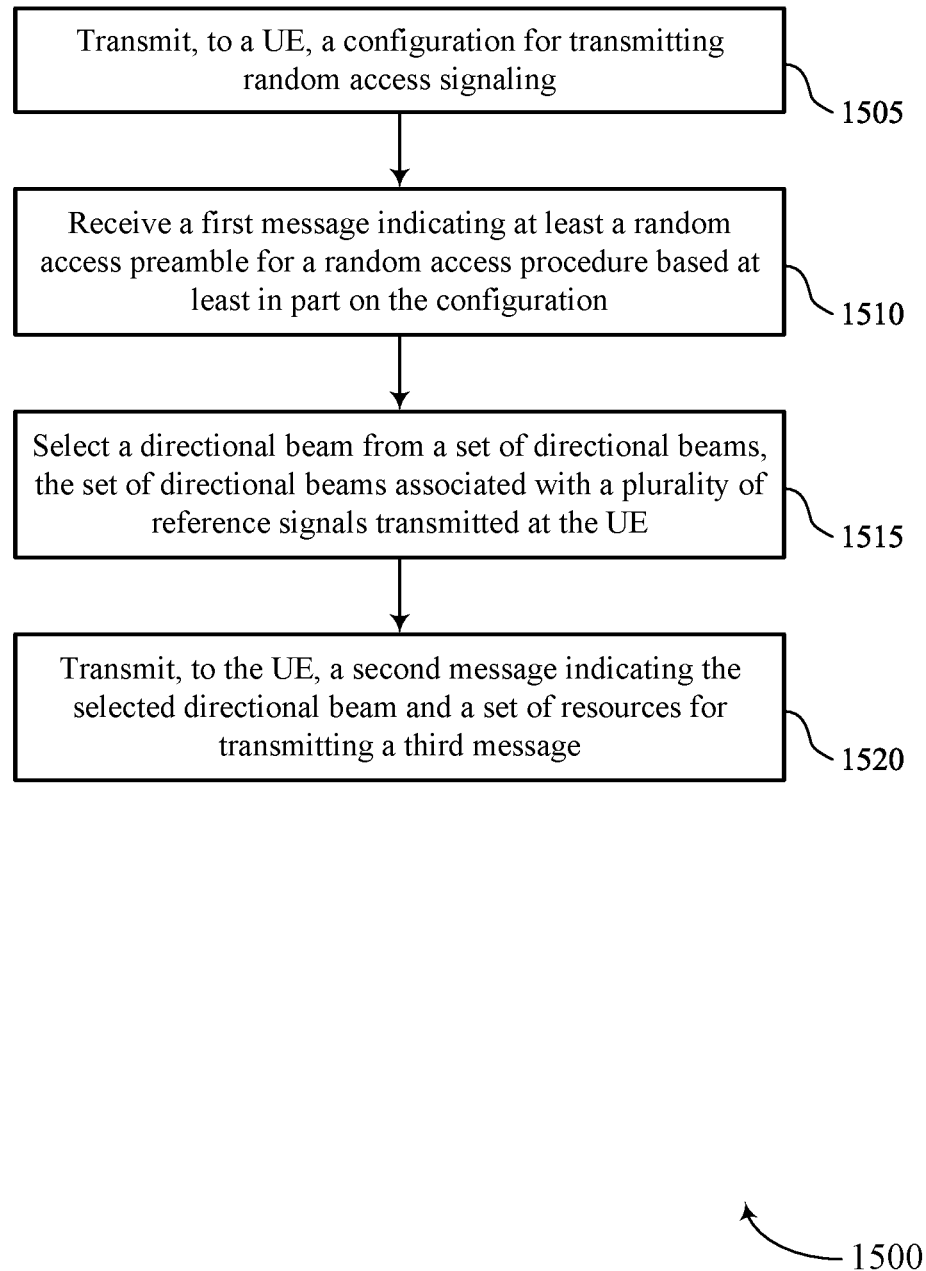

FIG. 15 shows a flowchart illustrating a method 1500 that supports uplink beam sweeping during random access procedures in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting, to a UE, a configuration for transmitting random access signaling. The operations of 1505 may be performed in accordance with examples as disclosed herein. In some examples, aspects of the operations of 1505 may be performed by a configuration manager 1025 as described with reference to FIG. 10.

At 1510, the method may include receiving a first message indicating at least a random access preamble for a random access procedure based on the configuration. The operations of 1510 may be performed in accordance with examples as disclosed herein. In some examples, aspects of the operations of 1510 may be performed by a preamble component 1030 as described with reference to FIG. 10.

At 1515, the method may include selecting a directional beam from a set of directional beams, the set of directional beams associated with a set of multiple reference signals transmitted at the UE. The operations of 1515 may be performed in accordance with examples as disclosed herein. In some examples, aspects of the operations of 1515 may be performed by a beam selection manager 1035 as described with reference to FIG. 10.

At 1520, the method may include transmitting, to the UE, a second message indicating the selected directional beam and a set of resources for transmitting a third message. The operations of 1520 may be performed in accordance with examples as disclosed herein. In some examples, aspects of the operations of 1520 may be performed by a RAR component 1040 as described with reference to FIG. 10.

Figure 16:
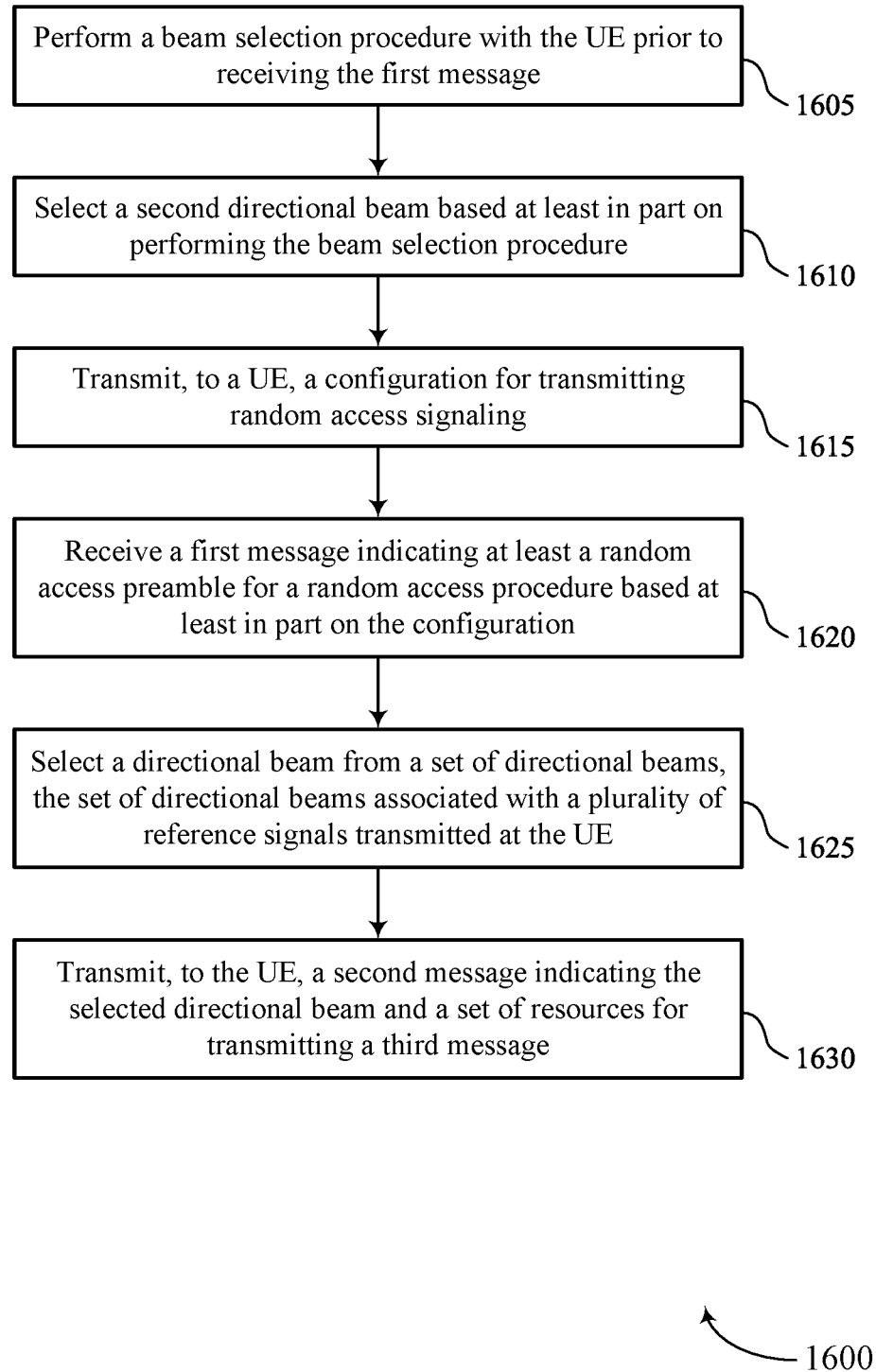

FIG. 16 shows a flowchart illustrating a method 1600 that supports uplink beam sweeping during random access procedures in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include performing a beam selection procedure with the UE prior to receiving the first message. The operations of 1605 may be performed in accordance with examples as disclosed herein. In some examples, aspects of the operations of 1605 may be performed by a beam selection manager 1035 as described with reference to FIG. 10.

At 1610, the method may include selecting a second directional beam based on performing the beam selection procedure. The operations of 1610 may be performed in accordance with examples as disclosed herein. In some examples, aspects of the operations of 1610 may be performed by a beam selection manager 1035 as described with reference to FIG. 10.

At 1615, the method may include transmitting, to a UE, a configuration for transmitting random access signaling. The operations of 1615 may be performed in accordance with examples as disclosed herein. In some examples, aspects of the operations of 1615 may be performed by a configuration manager 1025 as described with reference to FIG. 10.

At 1620, the method may include receiving a first message indicating at least a random access preamble for a random access procedure based on the configuration. The operations of 1620 may be performed in accordance with examples as disclosed herein. In some examples, aspects of the operations of 1620 may be performed by a preamble component 1030 as described with reference to FIG. 10.

At 1625, the method may include selecting a directional beam from a set of directional beams, the set of directional beams associated with a set of multiple reference signals transmitted at the UE. The operations of 1625 may be performed in accordance with examples as disclosed herein. In some examples, aspects of the operations of 1625 may be performed by a beam selection manager 1035 as described with reference to FIG. 10.

At 1630, the method may include transmitting, to the UE, a second message indicating the selected directional beam and a set of resources for transmitting a third message. The operations of 1630 may be performed in accordance with examples as disclosed herein. In some examples, aspects of the operations of 1630 may be performed by a RAR component 1040 as described with reference to FIG. 10.

Figure 17:
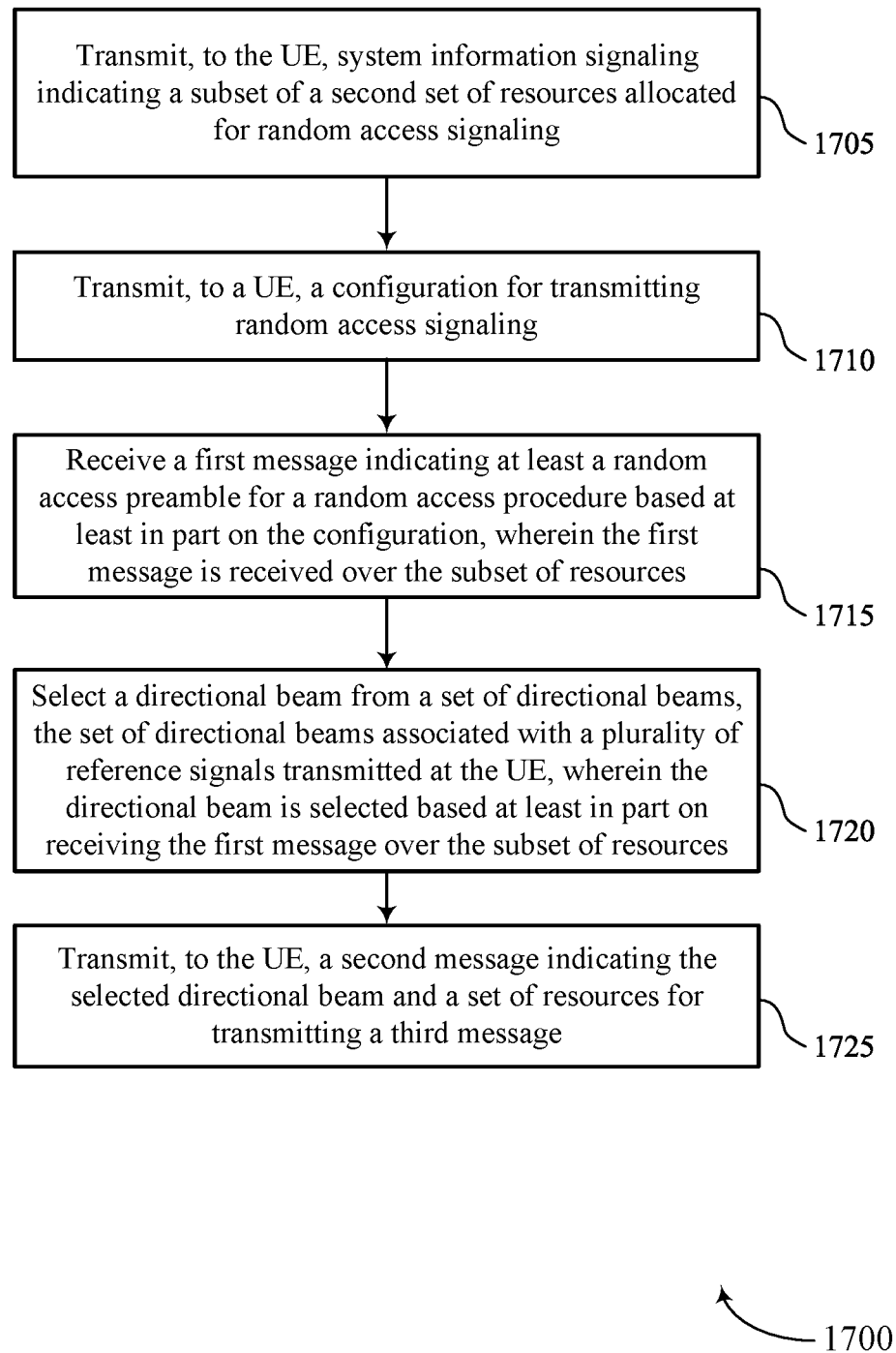

FIG. 17 shows a flowchart illustrating a method 1700 that supports uplink beam sweeping during random access procedures in accordance with aspects of the present disclosure. The operations of the method 1700 may be implemented by a base station or its components as described herein. For example, the operations of the method 1700 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1705, the method may include transmitting, to the UE, system information signaling indicating a subset of a second set of resources allocated for random access signaling. The operations of 1705 may be performed in accordance with examples as disclosed herein. In some examples, aspects of the operations of 1705 may be performed by a resource allocation manager 1045 as described with reference to FIG. 10.

At 1710, the method may include transmitting, to a UE, a configuration for transmitting random access signaling. The operations of 1710 may be performed in accordance with examples as disclosed herein. In some examples, aspects of the operations of 1710 may be performed by a configuration manager 1025 as described with reference to FIG. 10.

At 1715, the method may include receiving a first message indicating at least a random access preamble for a random access procedure based on the configuration, where the first message is received over the subset of resources. The operations of 1715 may be performed in accordance with examples as disclosed herein. In some examples, aspects of the operations of 1715 may be performed by a preamble component 1030 as described with reference to FIG. 10.

At 1720, the method may include selecting a directional beam from a set of directional beams, the set of directional beams associated with a set of multiple reference signals transmitted at the UE, where the directional beam is selected based on receiving the first message over the subset of resources. The operations of 1720 may be performed in accordance with examples as disclosed herein. In some examples, aspects of the operations of 1720 may be performed by a beam selection manager 1035 as described with reference to FIG. 10.

At 1725, the method may include transmitting, to the UE, a second message indicating the selected directional beam and a set of resources for transmitting a third message. The operations of 1725 may be performed in accordance with examples as disclosed herein. In some examples, aspects of the operations of 1725 may be performed by a RAR component 1040 as described with reference to FIG. 10.

The following provides an overview of aspects of the present disclosure:

Aspect 1: A method for wireless communication at a UE, comprising: transmitting a first message indicating at least a random access preamble for a random access procedure based at least in part on a configuration; transmitting a plurality of reference signals using a set of directional beams, wherein transmitting the plurality of reference signals is based at least in part on transmitting the first message; receiving, from a base station and as part of the random access procedure, a second message indicating a directional beam of the set of directional beams and a set of resources for transmitting a third message; transmitting, as part of the random access procedure, the third message over the set of resources using the indicated directional beam.

Aspect 2: The method of aspect 1, further comprising: performing a beam selection procedure with the base station prior to transmitting the first message; and identifying a second directional beam based at least in part on performing the beam selection procedure, wherein the first message is transmitted using the second directional beam.

Aspect 3: The method of aspect 2, further comprising: determining whether a signal strength value associated with the second directional beam satisfies a threshold, wherein transmitting the plurality of reference signals is based at least in part on the signal strength value satisfying the threshold.

Aspect 4: The method of any of aspects 2 through 3, wherein the directional beam is different from the second directional beam.

Aspect 5: The method of any of aspects 1 through 4, wherein the configuration indicates a set of parameters associated with the plurality of reference signals, the set of parameters comprising an indication of a quantity of reference signals, a second set of resources for transmitting each reference signal of the plurality of reference signals, a quantity of DMRS ports for transmitting the plurality of reference signals, a quantity of SRS ports for transmitting the plurality of reference signals, a scrambling sequence to generate the plurality of reference signals, a time duration between transmitting a first reference signal of the plurality of reference signals and transmitting a second reference signal of the plurality of reference signals, a time duration between transmitting the first message and transmitting a reference signal of the plurality of reference signals, or a combination thereof.

Aspect 6: The method of any of aspects 1 through 5, wherein the configuration indicates a beam sweeping pattern for transmitting the plurality of reference signals, the beam sweeping pattern comprising an indication of a quantity of directional beams, a quantity of resources associated with the same directional beam, a pattern as to which resources are associated with the same directional beam, or a combination thereof.

Aspect 7: The method of any of aspects 1 through 6, wherein the configuration indicates power control parameters for transmitting the plurality of reference signals, the power control parameters comprising an indication of an initial power value, a secondary power value, a power offset value with respect to power control parameters for transmitting the first message, a power ramp up value for each subsequent random access attempts, or a combination thereof.

Aspect 8: The method of any of aspects 1 through 7, further comprising: receiving, from the base station, the configuration via RMSI; or determining the configuration using a preconfigured rule, the preconfigured rule based at least in part on a relationship between a random access occasion and a sequence associated with the random access preamble selected by the UE for the random access procedure.

Aspect 9: The method of any of aspects 1 through 8, further comprising: receiving, from the base station, system information signaling indicating a subset of a second set of resources allocated for random access signaling, wherein the first message is transmitted over the subset of resources; and wherein transmitting the plurality of reference signals is based at least in part on transmitting the first message over the subset of resources.

Aspect 10: The method of any of aspects 1 through 9, further comprising: increasing a transmit power for a retransmission of the first message by a first amount based at least in part on the random access procedure failing; and increasing a transmit power for a retransmission of the set of reference signals by a second amount based at least in part on the random access procedure failing, wherein the first amount is different than the second amount.

Aspect 11: The method of any of aspects 1 through 10, wherein receiving the second message indicating the directional beam comprises: receiving an indication of a resource ID associated with a reference signal of the plurality of reference signals corresponding to the directional beam or a resource index of a set of resource indices, the set of resource indices corresponding to an order in which the plurality of reference signals are transmitted Aspect 12: The method of any of aspects 1 through 11, wherein one or both of the first message and the plurality of reference signals are transmitted without a timing advance.

Aspect 13: The method of any of aspects 1 through 12, wherein the plurality of reference signals comprises a plurality of DMRSs or a plurality of SRSs.

Aspect 14: A method for wireless communication at a base station, comprising: transmitting, to a UE, a configuration for transmitting random access signaling; receiving a first message indicating at least a random access preamble for a random access procedure based at least in part on the configuration; selecting a directional beam from a set of directional beams, the set of directional beams associated with a plurality of reference signals transmitted at the UE; and transmitting, to the UE, a second message indicating the selected directional beam and a set of resources for transmitting a third message.

Aspect 15: The method of aspect 14, further comprising: performing a beam selection procedure with the UE prior to receiving the first message; and selecting a second directional beam based at least in part on performing the beam selection procedure.

Aspect 16: The method of aspect 15, wherein the directional beam is different from the second directional beam.

Aspect 17: The method of any of aspects 14 through 16, wherein the configuration indicates a set of parameters associated with the plurality of reference signals, the set of parameters comprising an indication of a quantity of reference signals, a second set of resources for transmitting each reference signal of the plurality of reference signals, a quantity of DMRS ports for transmitting the plurality of reference signals, a quantity of SRS ports for transmitting the plurality of reference signals, a scrambling sequence to generate the plurality of reference signals, a time duration between the UE transmitting a first reference signal of the plurality of reference signals and transmitting a second reference signal of the plurality of reference signals, a time duration between the UE transmitting the first message and transmitting a reference signal of the plurality of reference signals, or a combination thereof.

Aspect 18: The method of any of aspects 14 through 17, wherein the configuration indicates a beam sweeping pattern for transmitting the plurality of reference signals, the beam sweeping pattern comprising an indication of a quantity of directional beams, a quantity of resources associated with the same directional beam, a pattern as to which resources are associated with the same directional beam, or a combination thereof.

Aspect 19: The method of any of aspects 14 through 18, wherein the configuration indicates power control parameters for transmitting the plurality of reference signals, the power control parameters comprising an indication of an initial power value, a secondary power value, a power offset value with respect to power control parameters for transmitting the first message, a power ramp up value for each subsequent random access attempts, or a combination thereof.

Aspect 20: The method of any of aspects 14 through 19, wherein transmitting the configuration comprises: transmitting, to the UE, RMSI, the RMSI comprising the configuration.

Aspect 21: The method of any of aspects 14 through 20, further comprising: transmitting, to the UE, system information signaling indicating a subset of a second set of resources allocated for random access signaling, wherein the first message is received over the subset of resources; and wherein the directional beam is selected based at least in part on receiving the first message over the subset of resources.

Aspect 22: The method of any of aspects 14 through 21, wherein transmitting the second message indicating the directional beam comprises: transmitting an indication of a resource ID associated with a reference signal of the plurality of reference signals corresponding to the directional beam or a resource index of a set of resource indices, the set of resource indices corresponding to an order in which the plurality of reference signals are transmitted.

Aspect 23: The method of any of aspects 14 through 22, wherein one or both of the first message and the plurality of reference signals do not have an applied timing advance.

Aspect 24: The method of any of aspects 14 through 23, wherein the plurality of reference signals comprises a plurality of DMRSs or a plurality of SRSs.

Aspect 25: An apparatus for wireless communication at a UE, comprising a processor; memory coupled with the processor; and instructions stored in the memory and executable by the processor to cause the apparatus to perform a method of any of aspects 1 through 13.

Aspect 26: An apparatus for wireless communication at a UE, comprising at least one means for performing a method of any of aspects 1 through 13.

Aspect 27: A non-transitory computer-readable medium storing code for wireless communication at a UE, the code comprising instructions executable by a processor to perform a method of any of aspects 1 through 13.

Aspect 28: An apparatus for wireless communication at a base station, comprising a processor; memory coupled with the processor; and instructions stored in the memory and executable by the processor to cause the apparatus to perform a method of any of aspects 14 through 24.

Aspect 29: An apparatus for wireless communication at a base station, comprising at least one means for performing a method of any of aspects 14 through 24.

Aspect 30: A non-transitory computer-readable medium storing code for wireless communication at a base station, the code comprising instructions executable by a processor to perform a method of any of aspects 14 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
transmitting a first message indicating at least a random access preamble for a random access procedure based at least in part on a configuration;
transmitting, as part of the random access procedure and after transmitting the first message indicating the at least random access preamble, a plurality of reference signals using a plurality of directional beams;
receiving, from a network device and based at least in part on transmitting the plurality of reference signals, a second message indicating a directional beam of the plurality of directional beams and a set of resources for transmitting a third message; and
transmitting, as part of the random access procedure, the third message over the set of resources using the indicated directional beam.

2. The method of claim 1, further comprising:
performing a beam selection procedure with the network device prior to transmitting the first message; and
identifying a second directional beam based at least in part on performing the beam selection procedure, wherein the first message is transmitted using the second directional beam.

3. The method of claim 2, further comprising:
determining whether a signal strength value associated with the second directional beam satisfies a threshold, wherein transmitting the plurality of reference signals is based at least in part on the signal strength value satisfying the threshold.

4. The method of claim 2, wherein the directional beam is different from the second directional beam.

5. The method of claim 1, wherein the configuration indicates a set of parameters associated with the plurality of reference signals, the set of parameters comprising an indication of a quantity of reference signals, a second set of resources for transmitting each reference signal of the plurality of reference signals, a quantity of demodulation reference signal ports for transmitting the plurality of reference signals, a quantity of sounding reference signal ports for transmitting the plurality of reference signals, a scrambling sequence to generate the plurality of reference signals, a time duration between transmitting a first reference signal of the plurality of reference signals and transmitting a second reference signal of the plurality of reference signals, a time duration between transmitting the first message and transmitting a reference signal of the plurality of reference signals, or a combination thereof.

6. The method of claim 1, wherein the configuration indicates a beam sweeping pattern for transmitting the plurality of reference signals, the beam sweeping pattern comprising an indication of a quantity of directional beams, a quantity of resources associated with a same directional beam, a pattern as to which resources are associated with the same directional beam, or a combination thereof.

7. The method of claim 1, wherein the configuration indicates power control parameters for transmitting the plurality of reference signals, the power control parameters comprising an indication of an initial power value, a secondary power value, a power offset value with respect to power control parameters for transmitting the first message, a power ramp up value for each subsequent random access attempts, or a combination thereof.

8. The method of claim 1, further comprising:
receiving, from the network device, the configuration via remaining minimum system information; or determining the configuration using a preconfigured rule, the preconfigured rule based at least in part on a relationship between a random access occasion and a sequence associated with the random access preamble selected by the UE for the random access procedure.

9. The method of claim 1, further comprising:
receiving, from the network device, system information signaling indicating a subset of a second set of resources allocated for random access signaling, wherein the first message is transmitted over the subset of resources; and wherein transmitting the plurality of reference signals is based at least in part on transmitting the first message over the subset of resources.

10. The method of claim 1, further comprising:
increasing a transmit power for a retransmission of the first message by a first amount based at least in part on the random access procedure failing; and
increasing a transmit power for a retransmission of the plurality of reference signals by a second amount based at least in part on the random access procedure failing, wherein the first amount is different than the second amount.

11. The method of claim 1, wherein receiving the second message indicating the directional beam comprises:
receiving an indication of a resource identifier associated with a reference signal of the plurality of reference signals corresponding to the directional beam or a resource index of a set of resource indices, the set of resource indices corresponding to an order in which the plurality of reference signals are transmitted.

12. The method of claim 1, wherein one or both of the first message and the plurality of reference signals are transmitted without a timing advance.

13. The method of claim 1, wherein the plurality of reference signals comprises a plurality of demodulation reference signals or a plurality of sounding reference signals.

14. A method for wireless communication at a network device, comprising:
transmitting, to a user equipment (UE), a configuration for transmitting random access signaling;
receiving a first message indicating at least a random access preamble for a random access procedure based at least in part on the configuration;
receiving, as part of the random access procedure and after receiving the first message from the UE indicating the at least random access preamble, a plurality of reference signals, each reference signal of the plurality of reference signals associated with a respective directional beam of a plurality of directional beams corresponding to the UE;
selecting a directional beam from the plurality of directional beams based at least in part on receiving the plurality of reference signals; and
transmitting, to the UE, a second message indicating the selected directional beam and a set of resources for transmitting a third message.

15. The method of claim 14, further comprising:
performing a beam selection procedure with the UE prior to receiving the first message; and
selecting a second directional beam based at least in part on performing the beam selection procedure.

16. The method of claim 15, wherein the directional beam is different from the second directional beam.

17. The method of claim 14, wherein the configuration indicates a set of parameters associated with the plurality of reference signals, the set of parameters comprising an indication of a quantity of reference signals, a second set of resources for transmitting each reference signal of the plurality of reference signals, a quantity of demodulation reference signal ports for transmitting the plurality of reference signals, a quantity of sounding reference signal ports for transmitting the plurality of reference signals, a scrambling sequence to generate the plurality of reference signals, a time duration between the UE transmitting a first reference signal of the plurality of reference signals and transmitting a second reference signal of the plurality of reference signals, a time duration between the UE transmitting the first message and transmitting a reference signal of the plurality of reference signals, or a combination thereof.

18. The method of claim 14, wherein the configuration indicates a beam sweeping pattern for transmitting the plurality of reference signals, the beam sweeping pattern comprising an indication of a quantity of directional beams, a quantity of resources associated with a same directional beam, a pattern as to which resources are associated with the same directional beam, or a combination thereof.

19. The method of claim 14, wherein the configuration indicates power control parameters for transmitting the plurality of reference signals, the power control parameters comprising an indication of an initial power value, a secondary power value, a power offset value with respect to power control parameters for transmitting the first message, a power ramp up value for each subsequent random access attempts, or a combination thereof.

20. The method of claim 14, wherein transmitting the configuration comprises:
transmitting, to the UE, remaining minimum system information, the remaining minimum system information comprising the configuration.

21. The method of claim 14, further comprising:
transmitting, to the UE, system information signaling indicating a subset of a second set of resources allocated for random access signaling, wherein the first message is received over the subset of resources; and wherein the directional beam is selected based at least in part on receiving the first message over the subset of resources.

22. The method of claim 14, wherein transmitting the second message indicating the directional beam comprises:
transmitting an indication of a resource identifier associated with a reference signal of the plurality of reference signals corresponding to the directional beam or a resource index of a set of resource indices, the set of resource indices corresponding to an order in which the plurality of reference signals are transmitted.

23. The method of claim 14, wherein one or both of the first message and the plurality of reference signals do not have an applied timing advance.

24. The method of claim 14, wherein the plurality of reference signals comprises a plurality of demodulation reference signals or a plurality of sounding reference signals.

25. An apparatus for wireless communication at a user equipment (UE), comprising:
a processor;
memory coupled with the processor; and
instructions stored in the memory and executable by the processor to cause the apparatus to:
transmit a first message indicating at least a random access preamble for a random access procedure based at least in part on a configuration;
transmit, as part of the random access procedure and after transmitting the first message indicating the at least random access preamble, a plurality of reference signals using a plurality of directional beams;
receive, from a network device and based at least in part on transmitting the plurality of reference signals, a second message indicating a directional beam of the plurality of directional beams and a set of resources for transmitting a third message; and
transmit, as part of the random access procedure, the third message over the set of resources using the indicated directional beam.

26. The apparatus of claim 25, wherein the instructions are further executable by the processor to cause the apparatus to:
perform a beam selection procedure with the network device prior to transmitting the first message; and
identify a second directional beam based at least in part on performing the beam selection procedure, wherein the first message is transmitted using the second directional beam.

27. The apparatus of claim 25, wherein the instructions are further executable by the processor to cause the apparatus to:
receive, from the network device, system information signaling indicating a subset of a second set of resources allocated for random access signaling, wherein the first message is transmitted over the subset of resources; and wherein transmitting the plurality of reference signals is based at least in part on transmitting the first message over the subset of resources.

28. An apparatus for wireless communication at a network device, comprising:
a processor;
memory coupled with the processor; and
instructions stored in the memory and executable by the processor to cause the apparatus to:
transmit, to a user equipment (UE), a configuration for transmitting random access signaling;
receive a first message indicating at least a random access preamble for a random access procedure based at least in part on the configuration;
receive, as part of the random access procedure and after receiving the first message from the UE indicating the at least random access preamble, a plurality of reference signals, each reference signal of the plurality of reference signals associated with a respective directional beam of a plurality of directional beams corresponding to the UE;
select a directional beam from the plurality of directional beams based at least in part on receiving the plurality of reference signals; and
transmit, to the UE, a second message indicating the selected directional beam and a set of resources for transmitting a third message.

29. The apparatus of claim 28, wherein the instructions are further executable by the processor to cause the apparatus to:
perform a beam selection procedure with the UE prior to receiving the first message; and
select a second directional beam based at least in part on performing the beam selection procedure.

30. The apparatus of claim 28, wherein the instructions are further executable by the processor to cause the apparatus to:

transmit, to the UE, system information signaling indicating a subset of a second set of resources allocated for random access signaling, wherein the first message is received over the subset of resources; and wherein the directional beam is selected based at least in part on receiving the first message over the subset of resources.

* * * * *